US007812978B2

(12) United States Patent
Ando et al.

(10) Patent No.: US 7,812,978 B2
(45) Date of Patent: Oct. 12, 2010

(54) APPLICATION EXECUTING METHOD, INFORMATION PROCESSING APPARATUS, IMAGE FORMING APPARATUS, TERMINAL EQUIPMENT, INFORMATION PROCESSING METHOD AND COMPUTER-READABLE STORAGE MEDIUM

(75) Inventors: Mitsuo Ando, Fukuoka (JP); Kunihiro Akiyoshi, Fukuoka (JP)

(73) Assignee: Ricoh Company, Ltd., Tokyo (JP)

( * ) Notice: Subject to any disclaimer, the term of this patent is extended or adjusted under 35 U.S.C. 154(b) by 1429 days.

(21) Appl. No.: 11/216,013

(22) Filed: Sep. 1, 2005

(65) Prior Publication Data

US 2006/0070087 A1 Mar. 30, 2006

(30) Foreign Application Priority Data

| | | |
|---|---|---|
| Sep. 7, 2004 | (JP) | 2004-260188 |
| Sep. 7, 2004 | (JP) | 2004-260190 |
| Aug. 18, 2005 | (JP) | 2005-237851 |

(51) Int. Cl.
*G06F 3/12* (2006.01)
*H04N 1/60* (2006.01)

(52) U.S. Cl. ....................................... 358/1.13; 358/1.9

(58) Field of Classification Search .................. 358/1.1, 358/1.9, 1.11-1.18
See application file for complete search history.

(56) References Cited

U.S. PATENT DOCUMENTS

| | | | | |
|---|---|---|---|---|
| 6,678,715 | B1 * | 1/2004 | Ando | 718/105 |
| 2003/0086111 | A1 | 5/2003 | Akiyoshi | |
| 2003/0123082 | A1 * | 7/2003 | Hall et al. | 358/1.15 |
| 2003/0218765 | A1 | 11/2003 | Ohishi et al. | |
| 2004/0021890 | A1 | 2/2004 | Hirai et al. | |
| 2004/0057067 | A1 | 3/2004 | Ohishi et al. | |
| 2004/0057074 | A1 | 3/2004 | Ohishi et al. | |
| 2004/0075857 | A1 | 4/2004 | Akiyoshi et al. | |
| 2004/0109188 | A1 | 6/2004 | Akiyoshi et al. | |
| 2004/0196471 | A1 | 10/2004 | Hirai et al. | |
| 2004/0218208 | A1 | 11/2004 | Akiyoshi et al. | |
| 2004/0239973 | A1 | 12/2004 | Tanaka et al. | |
| 2004/0255263 | A1 | 12/2004 | Ando | |
| 2005/0071648 | A1 | 3/2005 | Shimizu et al. | |
| 2005/0071660 | A1 | 3/2005 | Shimizu et al. | |

FOREIGN PATENT DOCUMENTS

| | | |
|---|---|---|
| JP | 2002-84383 | 3/2002 |
| JP | 2004-127281 | 4/2004 |

OTHER PUBLICATIONS

U.S. Appl. No. 11/509,601, filed Aug. 25, 2006, Ando, et al.
U.S. Appl. No. 11/521,567, filed Sep. 15, 2006, Ando.
U.S. Appl. No. 11/521,495, filed Sep. 15, 2006, Ando.

* cited by examiner

*Primary Examiner*—Thierry L Pham
(74) *Attorney, Agent, or Firm*—Oblon, Spivak, McClelland, Maier & Neustadt, L.L.P.

(57) ABSTRACT

An application executing method makes an information processing apparatus coupled to an image forming apparatus via a network to execute an application that functions in the image forming apparatus. The application executing method downloads the application from the image forming apparatus by the information processing apparatus, starts the downloaded application by the information processing apparatus, and absorbs differences in an execution environment of the application between the image forming apparatus and the information processing apparatus, by the information processing apparatus, so as to realize functions of the application in the information processing apparatus.

13 Claims, 27 Drawing Sheets

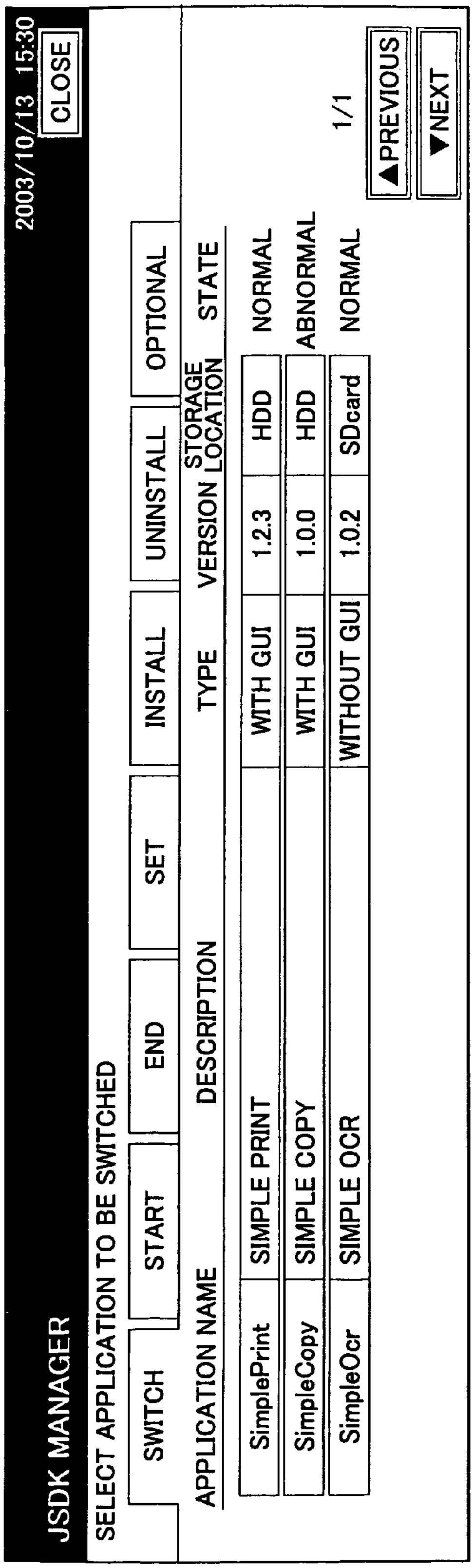

FIG.10A

JSDK MANAGER  2003/10/13 15:30  [CLOSE]

| SWITCH | START | END | SET | INSTALL | UNINSTALL | OPTIONAL |

SELECT APPLICATION TO BE SWITCHED

| APPLICATION NAME | DESCRIPTION | TYPE | VERSION | STORAGE LOCATION | STATE |
|---|---|---|---|---|---|
| SimplePrint | SIMPLE PRINT | WITH GUI | 1.2.3 | HDD | NORMAL |
| SimpleCopy | SIMPLE COPY | WITH GUI | 1.0.0 | HDD | ABNORMAL |
| SimpleOcr | SIMPLE OCR | WITHOUT GUI | 1.0.2 | SDcard | NORMAL |

1/1  ▲PREVIOUS ▼NEXT

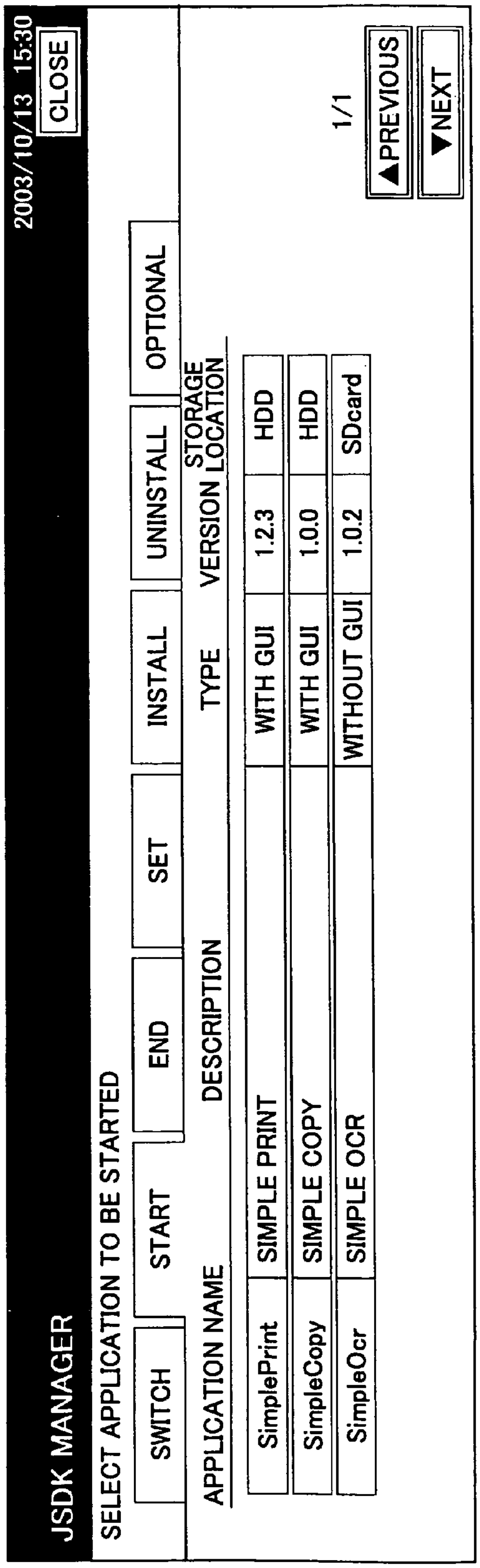

FIG.10B

JSDK MANAGER  2003/10/13 15:30  [CLOSE]

| SWITCH | START | END | SET | INSTALL | UNINSTALL | OPTIONAL |

SELECT APPLICATION TO BE STARTED

| APPLICATION NAME | DESCRIPTION | TYPE | VERSION | STORAGE LOCATION |
|---|---|---|---|---|
| SimplePrint | SIMPLE PRINT | WITH GUI | 1.2.3 | HDD |
| SimpleCopy | SIMPLE COPY | WITH GUI | 1.0.0 | HDD |
| SimpleOcr | SIMPLE OCR | WITHOUT GUI | 1.0.2 | SDcard |

1/1  ▲PREVIOUS ▼NEXT

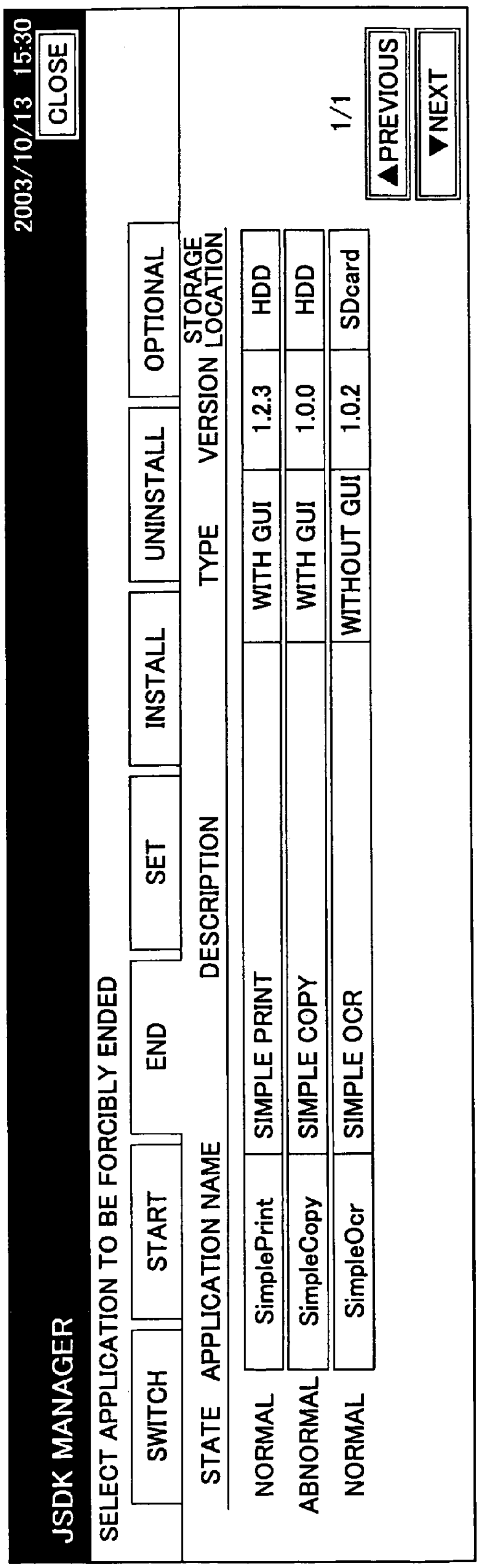

FIG.10C

JSDK MANAGER     2003/10/13 15:30   CLOSE

SELECT APPLICATION TO BE FORCIBLY ENDED

| SWITCH | START | END | SET | INSTALL | UNINSTALL | OPTIONAL |
|---|---|---|---|---|---|---|

| STATE | APPLICATION NAME | DESCRIPTION | TYPE | VERSION | STORAGE LOCATION |
|---|---|---|---|---|---|
| NORMAL | SimplePrint | SIMPLE PRINT | WITH GUI | 1.2.3 | HDD |
| ABNORMAL | SimpleCopy | SIMPLE COPY | WITH GUI | 1.0.0 | HDD |
| NORMAL | SimpleOcr | SIMPLE OCR | WITHOUT GUI | 1.0.2 | SDcard |

1/1 ▲PREVIOUS ▼NEXT

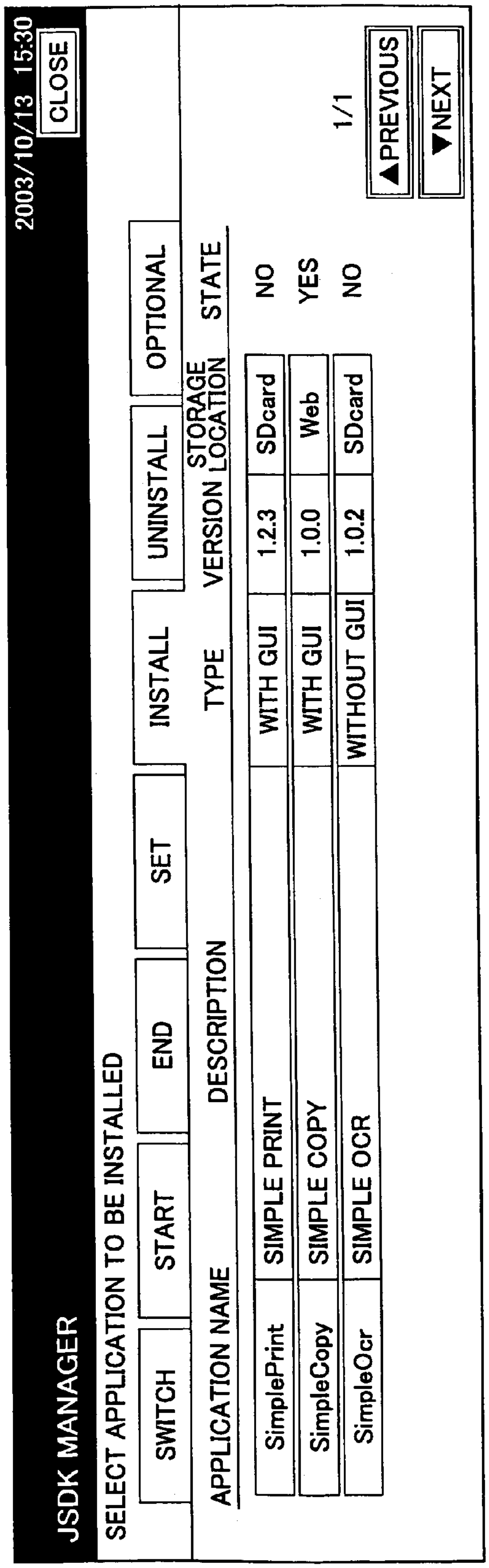

FIG.10D

JSDK MANAGER     2003/10/13 15:30   CLOSE

SELECT APPLICATION TO BE INSTALLED

| SWITCH | START | END | SET | INSTALL | UNINSTALL | OPTIONAL |
|---|---|---|---|---|---|---|

| APPLICATION NAME | DESCRIPTION | TYPE | VERSION | STORAGE LOCATION | STATE |
|---|---|---|---|---|---|
| SimplePrint | SIMPLE PRINT | WITH GUI | 1.2.3 | SDcard | NO |
| SimpleCopy | SIMPLE COPY | WITH GUI | 1.0.0 | Web | YES |
| SimpleOcr | SIMPLE OCR | WITHOUT GUI | 1.0.2 | SDcard | NO |

1/1 ▲PREVIOUS ▼NEXT

FIG.15

```
<?xml version="1.0" encoding="utf-8"?>
<! - - - JNLP File for JSDK Demo Application - ->
< jnlp
  spec="1.0+"
  codebase="sdcard://jsdk/0123"
  href="jsdk_demo. jnlp">
  <information>                                                   } 1
     <title> Jsdk Demo Application</title>                        ——1A
     <vendor>JSDK Providers Inc.</vendor>                         ——1B
   <telephone>092-441-####</telephone>                            ——1C
   <fax>092-411-####</fax>                                        ——1D
   <product-id>0123456</product-id>                               ——1E
     <homepage href="docs/help.html"/>
     <description>JSDK Demo Application</description>
     <icon href="images/JSDK_demo. jpg"/>
     <offline-allowed/>
  </information>
  <security>                                                      } 2
       <all-permissions/>
  </security>
  <resources>                                                     } 3
     < jsdk version="1.0"/>                                       ——3A
     < jar hrel="JSDKdemo. jar" version="1.0.1"/>                 ——3B
     <sub- jnlp="http://www.ricoh.com/jsdk/ocr. jnlp>             ——3C
  </resources>
  <update mode="mail">                                            } 4
     <mail address="xxx@yyy.zzz.co. jp"/>
  </update>
  <install mode="auto">                                           } 5
     <destination path="sdcard:/jsdk/0123"/>
  </install>
  <xlet-desc class="JSDKdemo"/ type="noGUI>                       } 6
</jnlp>
```

APPLICATION EXECUTING METHOD, INFORMATION PROCESSING APPARATUS, IMAGE FORMING APPARATUS, TERMINAL EQUIPMENT, INFORMATION PROCESSING METHOD AND COMPUTER-READABLE STORAGE MEDIUM

BACKGROUND OF THE INVENTION

1. Field of the Invention

The present invention generally relates to, and more particularly to application executing methods, information processing apparatuses, image forming apparatuses, terminal equipments, information processing methods and computer-readable storage media, and more particularly to an application executing method for causing an information processing apparatus that connects to an image forming apparatus via a network to execute an application functioning in the image forming apparatus, and to an information processing apparatus, an image forming apparatus and a terminal equipment that may employ such an application executing method. The present invention also relates to an information processing method, and a computer-readable storage medium that stores an application executing program or an information processing program.

2. Description of the Related Art

Recently, composite apparatuses or Multi Function Peripherals (MFPs) having a copy function or facility, a scanner function or facility and a facsimile function or facility have been marketed. When the composite apparatus or MFP functions as a copying apparatus or a printer, an image is printed on a printing medium such as paper. When the composite apparatus or MFP functions as a copying apparatus or a scanner, an image is read from a document. When the composite apparatus or MFP functions as a facsimile apparatus, an image is set to or received from another equipment via a telephone line.

Various kinds of operation screens for making various kinds of operations are displayed on the screen of the composite apparatus or MFP. For example, a "copy operation screen" is used for causing the composite apparatus or MFP to execute a copy process. In addition, various kinds of operation screens for making various kinds of operations on the screen of a PC client of the composite apparatus or MFP are displayed on the screen of the client PC of the composite apparatus or MFP. For example, a "print operation screen" is used for causing the composite apparatus or MFP to execute a print process.

If the applications that are executed in the composite apparatus or MFP to display the operation screen such as the "copy operation screen" on the screen of the composite apparatus or MFP, and the applications that are executed in the client PC of the composite apparatus or MFP to display the operation screen such as the "print operation screen" on the screen of the client PC of the composite apparatus or MFP, have a high degree of freedom such that the applications can be executed in various kinds of equipments and can control various kinds of equipments, it would be convenient because this will enable the applications to be used in common among the different kinds of equipments.

SUMMARY OF THE INVENTION

Accordingly, it is a general object of the present invention to provide a novel and useful application executing method, information processing apparatus, image forming apparatus, terminal equipment, information processing method and computer-readable storage medium, in which the problems described above are suppressed.

Another and more specific object of the present invention is to provide an application executing method, an information processing apparatus, an image forming apparatus, a terminal equipment, an information processing method and a computer-readable storage medium, that enable the functions or facilities of the applications that are executed in an image forming apparatus to be realized in other apparatuses or equipments.

Still another and more specific object of the present invention is to provide an application executing method for making an information processing apparatus coupled to an image forming apparatus via a network to execute an application that functions in the image forming apparatus, comprising a downloading step downloading the application from the image forming apparatus by the information processing apparatus; an application starting step starting the downloaded application by the information processing apparatus; and an execution environment absorbing step absorbing differences in an execution environment of the application between the image forming apparatus and the information processing apparatus, by the information processing apparatus, so as to realize functions of the application in the information processing apparatus. According to the application executing method of the present invention, it is possible to enable the functions or facilities of the applications that are executed in the image forming apparatus to be realized in other apparatuses or equipments.

A further object of the present invention is to provide an information processing apparatus for executing an application that functions in an image forming apparatus which is coupled to the information processing apparatus via a network, comprising a downloading part configured to download the application from the image forming apparatus; an application starting part configured to start the downloaded application; and an execution environment absorbing part configured to absorb differences in an execution environment of the application between the image forming apparatus and the information processing apparatus, so as to realize functions of the application in the information processing apparatus. According to the information processing apparatus of the present invention, it is possible to enable the functions or facilities of the applications that are executed in the image forming apparatus to be realized in other apparatuses or equipments.

Another object of the present invention is to provide an image forming apparatus adapted to execute an application, comprising an application providing part configured to send the application to an information processing apparatus that is coupled to the image forming apparatus via a network, in response to a request from the information processing apparatus; and a communicating part configured to communicate with the information processing apparatus, so as to cause the information processing apparatus to absorb differences in an execution environment of the application between the image forming apparatus and the information processing apparatus. According to the image forming apparatus of the present invention, it is possible to enable the functions or facilities of the applications that are executed in the image forming apparatus to be realized in other apparatuses or equipments.

Still another object of the present invention is to provide a computer-readable storage medium which stores an application executing program for causing an information processing apparatus that is coupled to an image forming apparatus via a network to execute an application that functions in the image forming apparatus, the application executing comprising an application starting procedure causing the information processing apparatus to start the application that is downloaded from the image forming apparatus; and an execution environment absorbing procedure causing the information processing apparatus to absorb differences in an execution environment of the application between the image forming apparatus and the information processing apparatus, so as to realize functions of the application in the information processing apparatus. According to the computer-readable storage medium of the present invention, it is possible to enable the functions or facilities of the applications that are executed in the image forming apparatus to be realized in other apparatuses or equipments.

A further object of the present invention is to provide a terminal equipment that functions as an emulator of an image forming apparatus, comprising a display configured to display a screen; and a starting part configured to start, within the terminal equipment, a Web application that displays on the display an operation screen for carrying out an operation on the screen of the terminal equipment. According to the terminal equipment of the present invention, it is possible to enable the functions or facilities of the applications that are executed in the image forming apparatus to be realized in other apparatuses or equipments.

Another object of the present invention is to provide a terminal equipment that functions as an emulator of an image forming apparatus, comprising a display configured to display a screen; and a starting part configured to start, within the terminal equipment, an application that includes a starting function and an absorbing function, wherein the starting function starts, within the terminal equipment, a Web application that displays on the display an operation screen for carrying out an operation on the screen of the terminal equipment, and the absorbing function absorbs differences in an execution environment of the Web application. According to the terminal equipment of the present invention, it is possible to enable the functions or facilities of the applications that are executed in the image forming apparatus to be realized in other apparatuses or equipments.

Still another object of the present invention is to provide an information processing method that is executed by a terminal equipment that functions as an emulator of an image forming apparatus, comprising a starting step starting, within the terminal equipment, a Web application that displays on a display of the terminal equipment an operation screen for carrying out an operation on the screen of the terminal equipment. According to the information processing method of the present invention, it is possible to enable the functions or facilities of the applications that are executed in the image forming apparatus to be realized in other apparatuses or equipments.

A further object of the present invention is to provide an information processing method that is executed by a terminal equipment that functions as an emulator of an image forming apparatus, comprising a starting step starting, within the terminal equipment, an application that includes a starting function and an absorbing function, wherein the starting function starts, within the terminal equipment, a Web application that displays on a display of the terminal equipment an operation screen for carrying out an operation on the screen of the terminal equipment, and the absorbing function absorbs differences in an execution environment of the Web application. According to the information processing method of the present invention, it is possible to enable the functions or facilities of the applications that are executed in the image forming apparatus to be realized in other apparatuses or equipments.

Another object of the present invention is to provide a computer-readable storage medium which stores a program for causing a computer to function as an emulator of an image forming apparatus, the program comprising a starting procedure causing the computer to start, within the computer, a Web application that displays on a display of the computer an operation screen for carrying out an operation on the screen of the computer. According to the computer-readable storage medium of the present invention, it is possible to enable the functions or facilities of the applications that are executed in the image forming apparatus to be realized in other apparatuses or equipments.

Still another object of the present invention is to provide a computer-readable storage medium which stores a program for causing a computer to function as an emulator of an image forming apparatus, the program comprising a starting procedure causing the computer to start, within the computer, an application that includes a starting function and an absorbing function, wherein the starting function starts, within the computer, a Web application that displays on a display of the computer an operation screen for carrying out an operation on the screen of the computer, and the absorbing function absorbs differences in an execution environment of the Web application. According to the computer-readable storage medium of the present invention, it is possible to enable the functions or facilities of the applications that are executed in the image forming apparatus to be realized in other apparatuses or equipments.

Other objects and further features of the present invention will be apparent from the following detailed description when read in conjunction with the accompanying drawings.

BRIEF DESCRIPTION OF THE DRAWINGS

FIGS. 10A through 10E are diagrams for explaining a GUI of the JSDK system;

FIG. 15 is a diagram showing an example of a sentence structure of a JNLP file;

DESCRIPTION OF THE PREFERRED EMBODIMENTS

Figure 1:
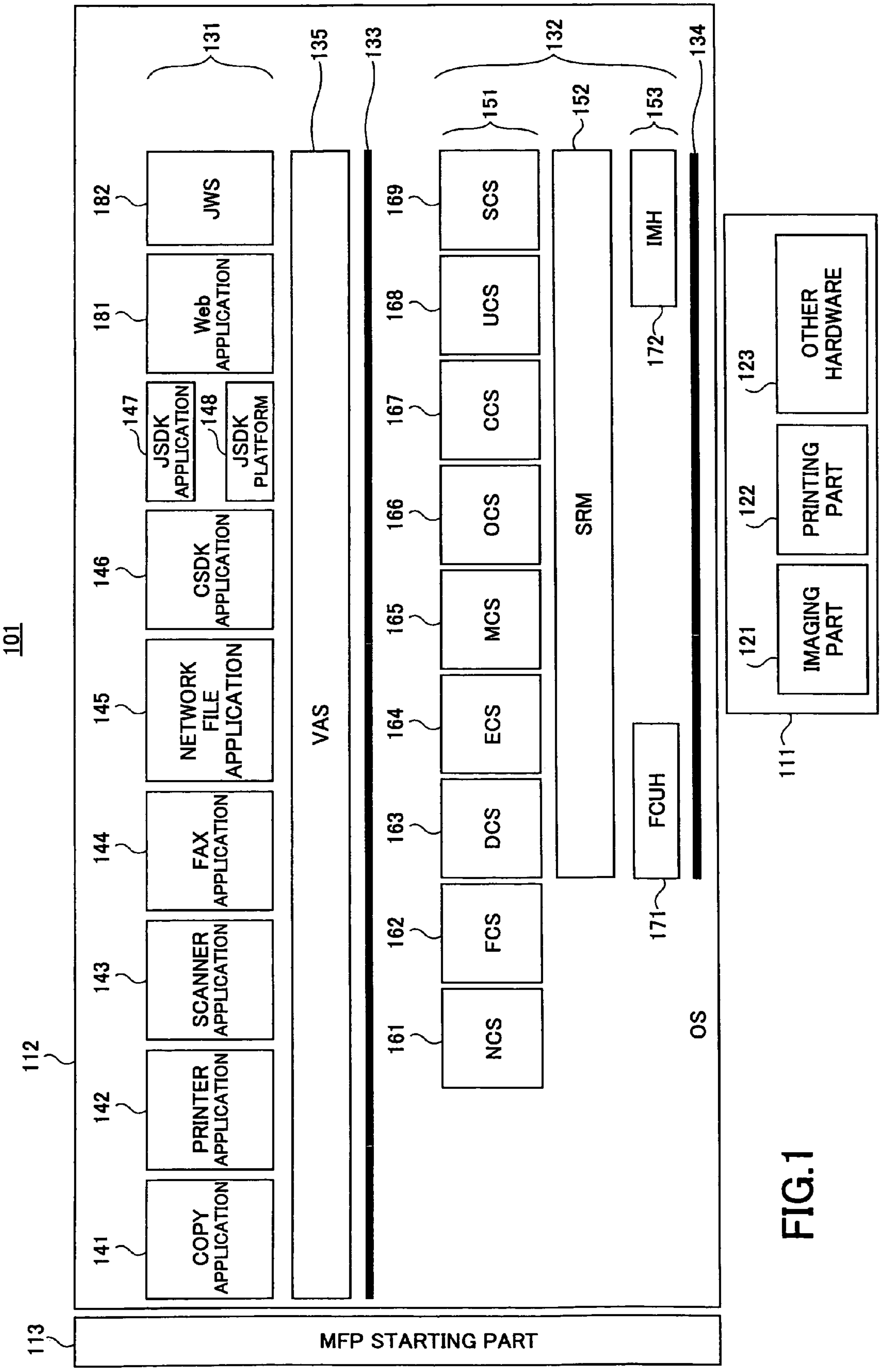
FIG. 1 is a diagram showing an MFP corresponding to an embodiment of the present invention.

FIG. 1 shows an MFP 101 corresponding to an embodiment of the present invention. The MFP 101 shown in FIG. 1 includes various kinds of hardware 111, various kinds of software 112, and an MFP starting (or booting) part 113.

The hardware 111 of the MFP 101 includes an imaging part 121, a printing part 122, and other hardware 123. The imaging part 121 is a hardware for reading an image (image data) from a document. The printing part 122 is a hardware for printing an image (image data) on a printing medium such as paper.

The software 112 of the MFP 101 includes various kinds of applications 131 and various kinds of platforms 132. These programs are executed in parallel in units of processes by an Operating System (OS) such as UNIX (registered trademark).

The applications 131 include a copy application 141 for the copy function or facility, a printer application 142 for the printer function or facility, a scanner application 143 for the scanner function or facility, a facsimile application 144 for the facsimile function or facility, a network file application 145 for the network file function or facility, a Web browser 181 for the Web client, and a Java (registered trademark) Web Start (JWS) 182 for the Web client.

The applications 131 may be developed by use of an exclusive Software Developing Kit (SDK). The application 131 that is developed by use of the SDK will be referred to as an "SDK application". Exclusive SDKs include a "CSDK" for developing the application 131 in the C language, and a "JSDK" for developing the application 131 in the Java language. The application 131 that is developed by use of the CSDK will be referred to as a "CDSK application", and the application 131 that is developed by use of the JSDK will be referred to as a "JSDK application". A CSDK application 146 and a JSDK application 147 exist in the MFP 101 shown in FIG. 1. The MFP 101 shown in FIG. 1 further includes a JSDK platform 148, as the software 112 that intermediates between the JSDK application 147 that is written in the Java language and the other software 112 that is written in the C language.

The platforms 132 include various kinds of control services 151, a System Resource Manager (SRM) 152, and various kinds of handlers 153. The control services 151 include a Network Control Service (NCS) 161, a Facsimile Control Service (FCS) 162, a Delivery Control Service (DCS) 163, an Engine Control Service (ECS) 164, a Memory Control Service (MCS) 165, an Operation Panel Control Service (OCS) 166, a Certification Control Service (CCS) 167, a User-directory Control Service (UCS) 168, and a System Control Service (SCS) 169. The handlers 153 include a Facsimile Control Unit Handler (FCUH) 171 and an Image Memory Handler (IMH) 172.

The process of the NCS 161 includes intermediating the network communication. The process of the FCS 162 includes providing the facsimile API. The process of the DCS 163 includes control related to the stored document distributing process. The process of the ECS 164 includes control related to the imaging part 121 and the printing part 122. The process of the MCS 165 includes control related to the memory and the Hard Disk Drive (HDD). The process of the OCS 166 includes control related to the operation panel. The process of the CCS 167 includes control related to the authentication process and the accounting process. The process of the UCS 168 includes control related to the user information management. The process of the SCS 169 includes control related to the system management.

A Virtual Application Service (VAS) 135 exists as one of the software 112 that intermediate between the applications 131 and the platforms 132. The VAS 135 operates as a server process that regards the application 131 as the client, and operates as a client process that regards the platform 132 as the server. The VAS 135 includes a rapping function that conceals the platform 132 when viewed from the application 131, and has a role of absorbing a version difference when the version of the platform 132 is upgraded.

The MFP start part 113 is first executed when the power of the MFP 101 is turned ON. Hence, the OS such as the UNIX is started, and the applications 131 and the platforms 132 are started. These programs are stored in the HDD or memory card, reproduced from the HDD or memory card, and loaded into the memory.

Figure 2:
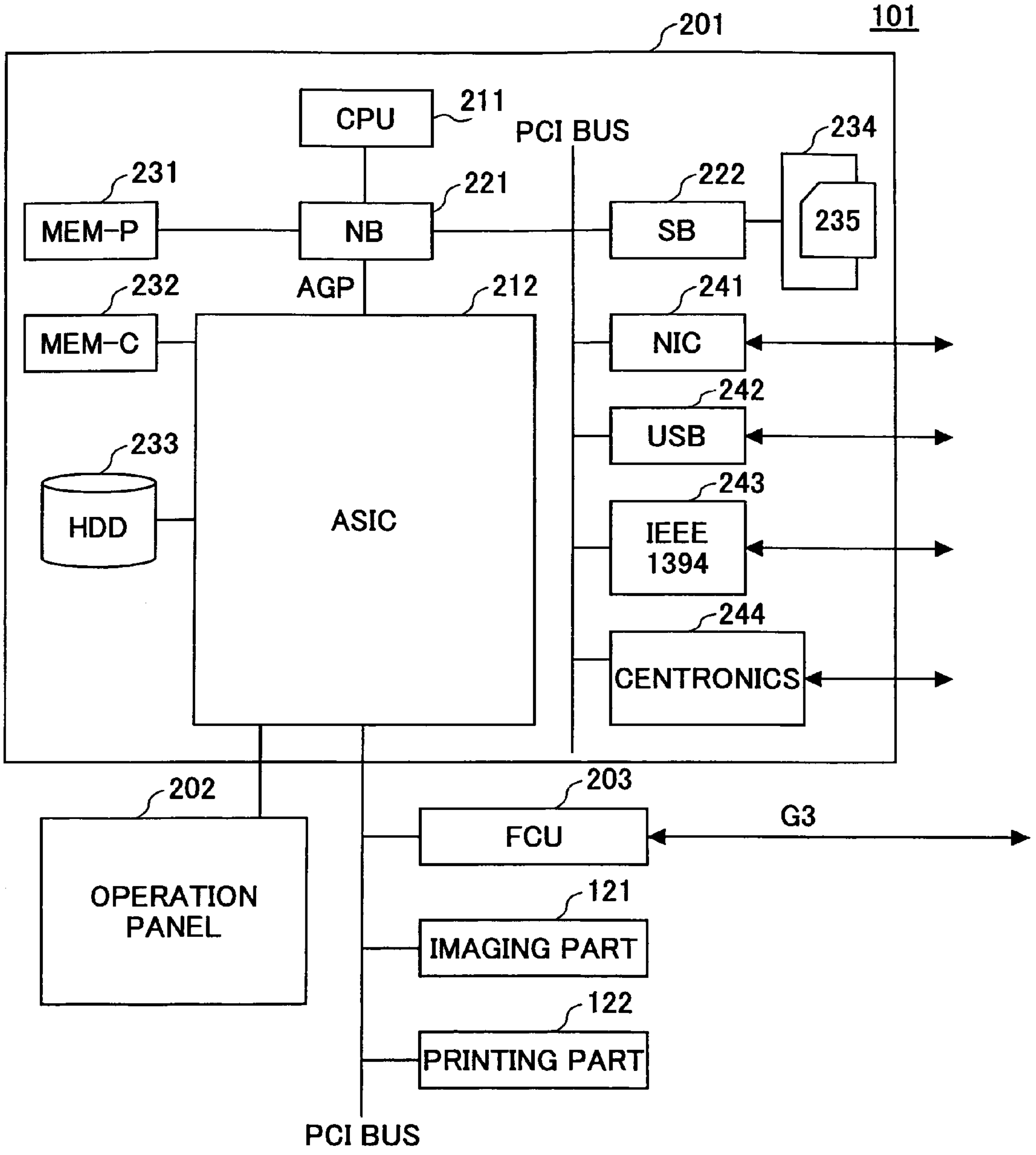
FIG. 2 is a diagram showing a hardware structure of the MFP shown in FIG. 1.

FIG. 2 is a diagram showing a hardware structure related to the MFP 101 shown in FIG. 1. The hardware 111 of the MFP 101 includes a controller 201, an operation panel 202, a Facsimile Control Unit (FCU) 203, the imaging part 121 and the printing part 122.

The controller 201 includes a CPU 211, an ASIC 212, a North Bridge (NB) 221, a South Bridge (SB) 222, a system memory (MEM-P) 231, a local memory (MEM-C) 232, a HDD 233, a memory card slot 234, a Network Interface Controller (NIC) 241, an USB device, an IEEE1394 device 243, and a Centronics device 244.

The CPU 211 is an IC for processing various kinds of information. The ASIC 212 is an IC for processing various kinds of images. The NB 221 is the north bridge of the controller 201. The SB 222 is the south bridge of the controller 201. The system memory (MEM-P) 231 is the system memory of the MFP 101. The local memory (MEM-C) 232 is the local memory of the MFP 101. The HDD 233 is a storage of the MFP 101. The memory card slot 234 is a slot for setting a memory card 235. The NIC 241 is a controller for network communication using the MAC address. The USB device 242 is a device for providing connection terminals of the ISB standard. The IEEE1394 device 243 is a device for providing connection terminals of the IEEE1394 standard. The Centronics device 244 is a device for providing connection terminals of Centronics specifications.

The operation panel 202 forms a hardware (operation part) that is operated by an operator to make an input to the MFP 101, and also forms a hardware (display part) for the operator to obtain an output from the MFP 101.

Figure 3:
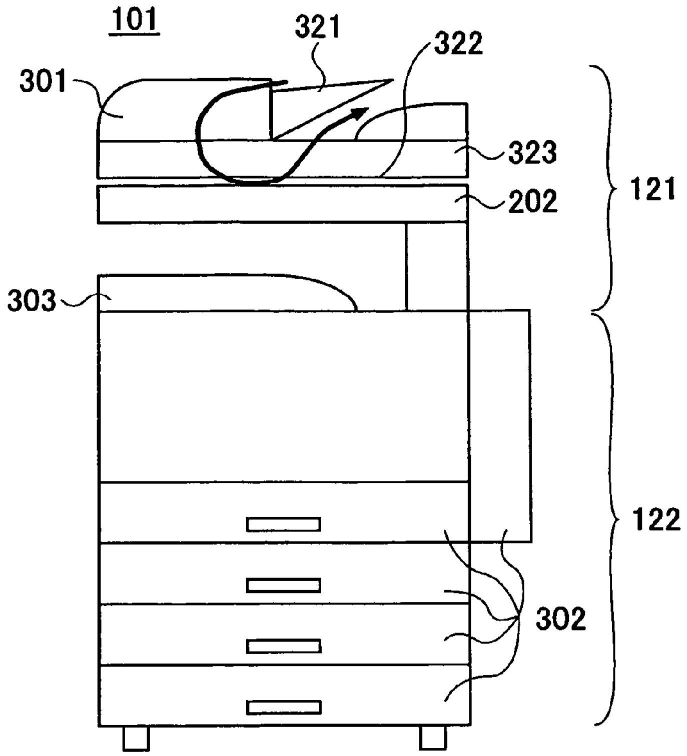
FIG. 3 is a diagram showing an external appearance of the MFP shown in FIG. 1.

FIG. 3 is a diagram showing an external appearance of the MFP 101 shown in FIG. 1. FIG. 3 shows a position of the imaging part 121, a position of the printing part 122, and a position of the operation panel 202. FIG. 3 further shows a document set part 301 where the documents to be read are set, a paper supply part 302 from where the printing paper is supplied, and a paper eject part 303 to where the printing paper is ejected. The document set part 301 is a constituent element of the imaging part 121. The paper supply part 302 is a constituent element of the printing part 122. The printing part 122 is a constituent element of the printing part 122.

Figure 4:
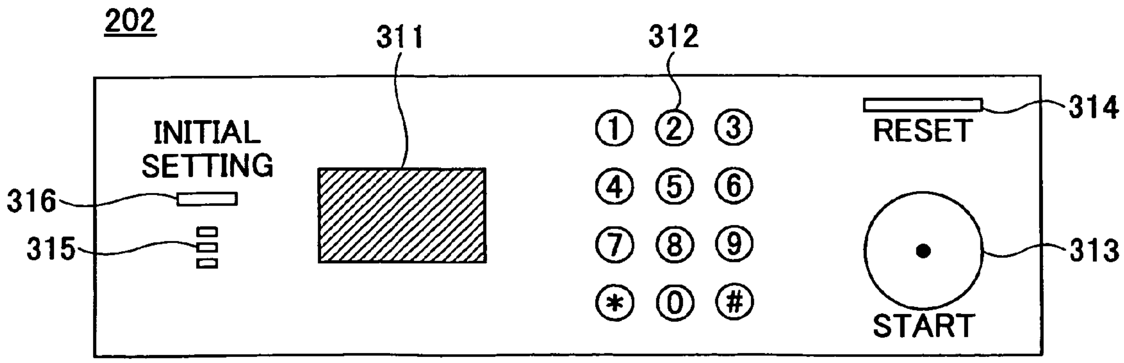
FIG. 4 is a diagram showing an operation panel.

FIG. 4 is a diagram showing the operation panel 202. As shown in FIG. 4, the operation panel 202 includes a touch panel 311, a ten-key 312, a start button 313, a reset button 314, function keys 315, and an initial setting button 316. The touch panel 311 is a hardware (touch operation part) for making the input by a touch operation, and is also a hardware (screen display part) for obtaining the output by a screen display. The ten-key 312 is a hardware for making a numerical input by a key (button) operation. The start button 313 is a hardware for making a start operation by a button operation. The reset button 314 is a hardware for making a reset operation by a button operation. The function key 315 is a hardware for displaying an operation screen by the CSDK 146 or the JSDK 147 by a key (button) operation. The initial setting button 316 is a hardware for displaying an initial setting screen by a button operation.

The document set part 301 includes an Automatic Document Feeder or feeding unit (ADF) 321, a flat bed 322, and a flat bed cover 323. The paper supply part 302 is formed by 4 paper supply trays. The paper eject part 303 is formed by 1 paper eject tray. A plurality of documents to be read (hereinafter also referred to as reading documents) can be set on the ADF 321. The reading document is set face down on the flat bed 322.

The MFP 101 shown in FIG. 1 can function as a "Web server" which regards the MFP 101 itself as a "Web client", and also function as a "Web server" which regards another equipment as the "Web client". It is assumed for the sake of convenience that, Java applications such as a JSP and a Servlet that are Web applications for the Web server are executed in the Web server, and Java applications such as a Applet and an Xlet that are Web applications for the Web client are executed in the Web client. For this reason, it is assumed for the sake of convenience that a Web server software and a Java Embedded Server (JES) are installed in the Web server, and a Web browser and a Java Web Start (JWS) are installed in the Web client.

Figure 5:
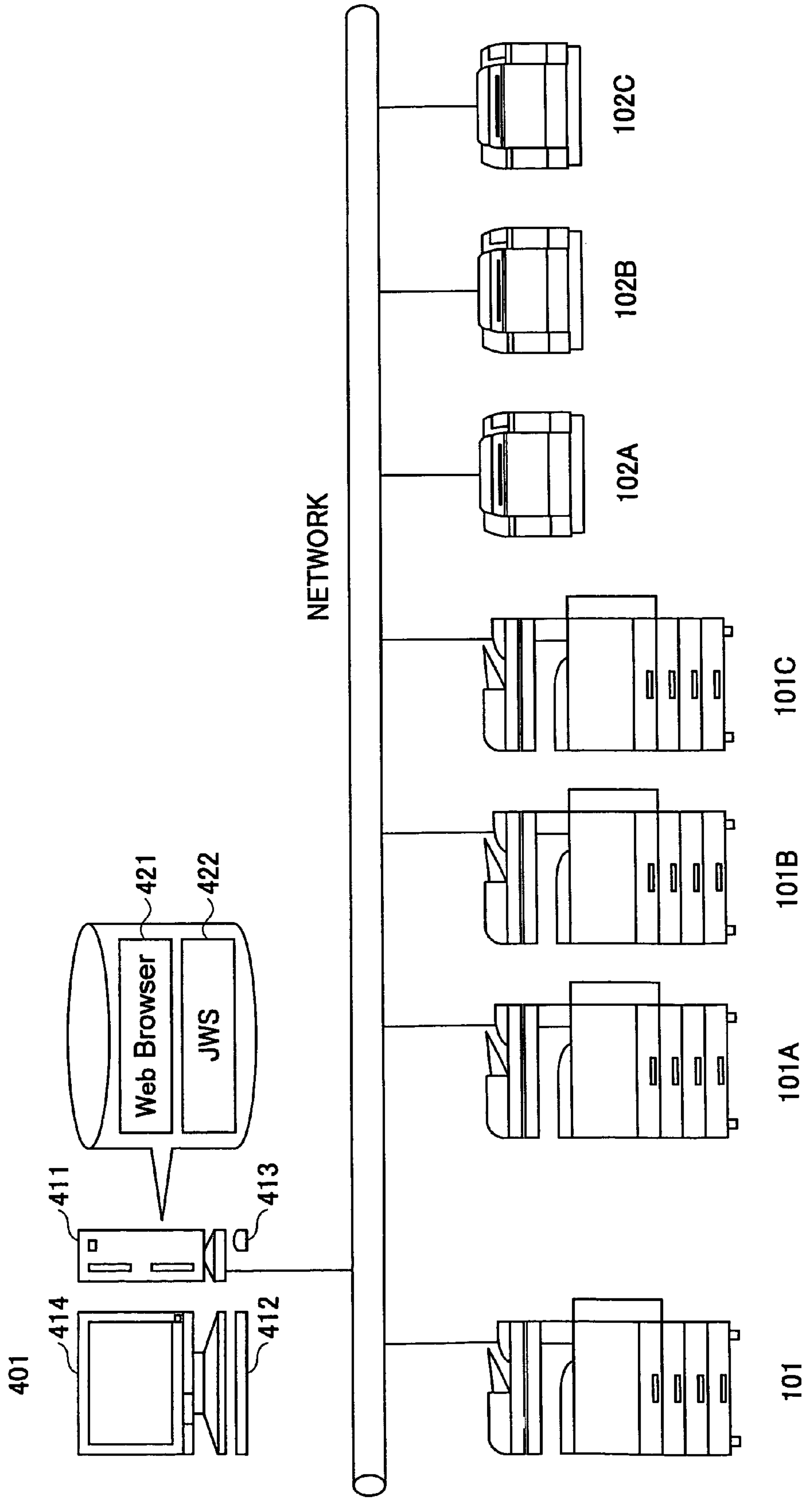
FIG. 5 is a diagram showing a network structure related to a network to which the MFP shown in FIG. 1 is connected.

FIG. 5 is a diagram showing a network structure related to a network to which the MFP 101 shown in FIG. 1 is connected. The MFP 101 shown in FIG. 1 is connected to MFPs 101A, 101B and 101C, printers 102A, 102B and 102C, and a Personal Computer (PC) 401 or the like via the network. The PC 401 shown in FIG. 5 includes a main PC body 411, a keyboard 412, a mouse 413, a display 414 and the like. The main PC body 411 includes a CPU, a ROM, a RAM, an HDD, a modem, an NIC and the like. A Web browser 421 and a JWS 422 are installed in the HDD of the main PC body 411.

Figure 6:
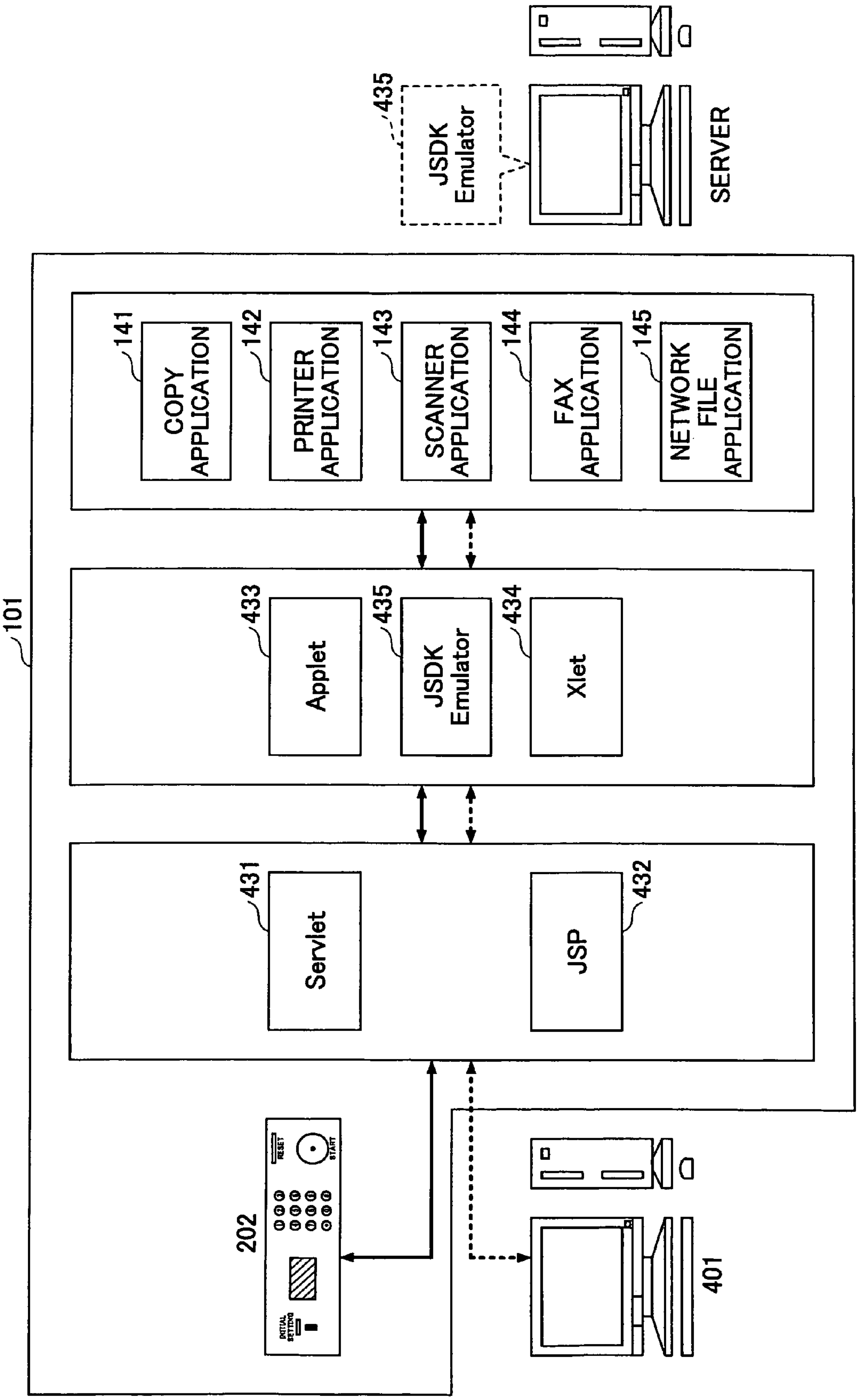
FIG. 6 is a diagram showing a software structure related to a Web function of the MFP shown in FIG. 1.

FIG. 6 is a diagram showing a software structure related to a Web function or facility of the MFP 101 shown in FIG. 1. In FIG. 6, a solid line arrow indicates a state where the MFP 101 shown in FIG. 1 functions as the Web server which regards the MFP 101 itself (operation panel 202 shown in FIG. 2) as the Web client. In FIG. 6, a dotted line arrow indicates a state where the MFP 101 shown in FIG. 1 functions as the Web server which regards the other equipment (PC 401 shown in FIG. 5) as the Web client. Java applications such as various kinds of Servlets 431, various kinds of JSPs 432, Various kinds of Applets 433, various kinds of Xlets 434, and JSDK Emulator 435 exist in the MFP 101 shown in FIG. 1. The JSDK Emulator 435 may exist in a server that is connected to the MFP 101 shown in FIG. 1 via a network.

Figure 7A:
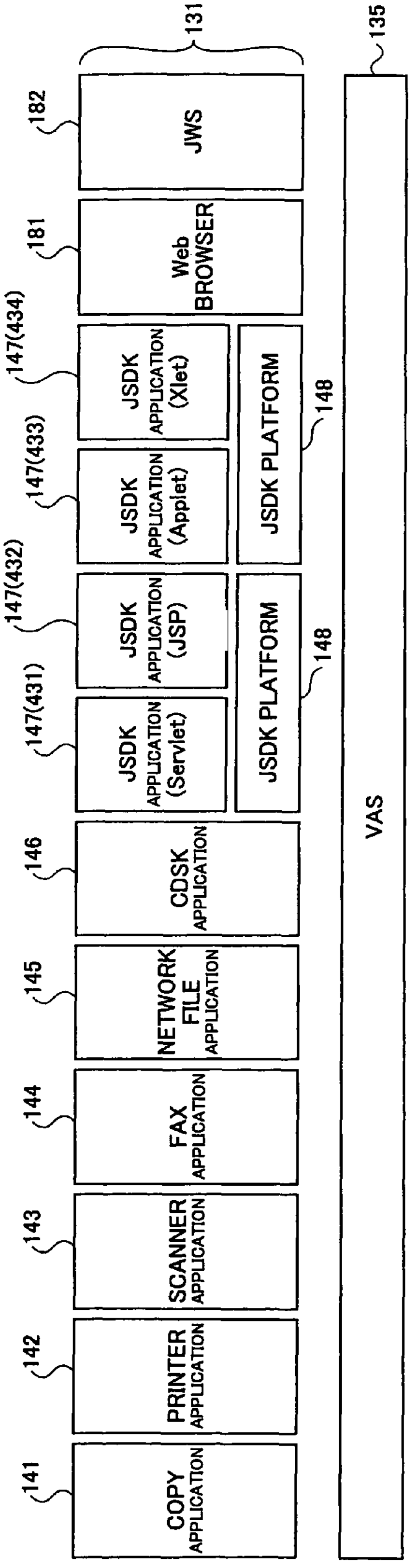
FIGS. 7A and 7B are diagrams showing a software structure related to the MFP shown in FIG. 1.
Figure 7B:
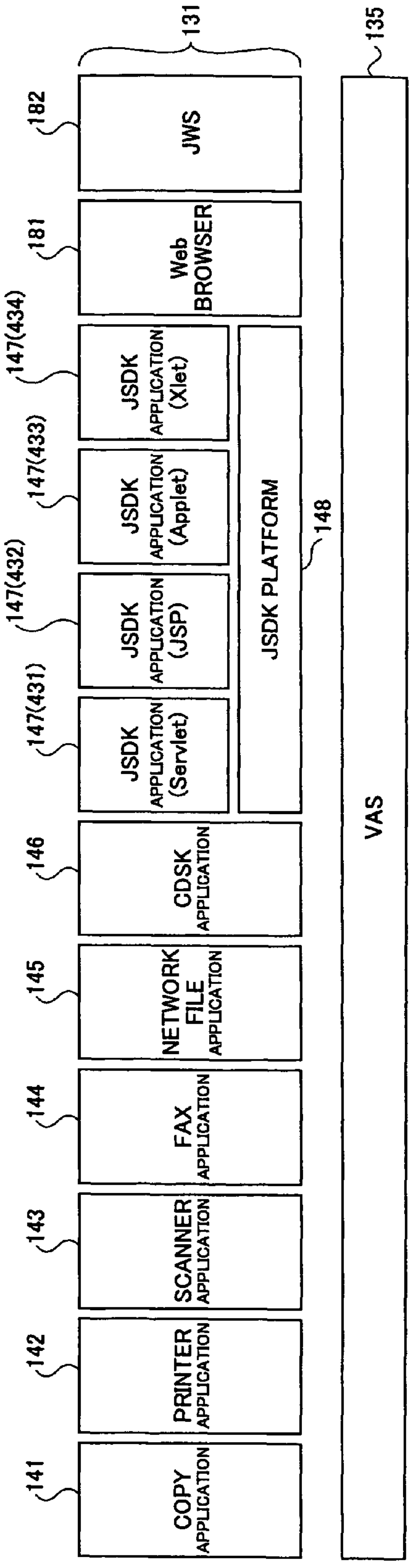

FIGS. 7A and 7B are diagrams showing a software structure related to the MFP 101 shown in FIG. 1. The JSDK platform 148 for the JSDK applications 147 such as the Servlet 431 and the JSP 432, and the JSDK platform 148 for the JSDK applications 147 such as the Applet 433 and the Xlet 434 are provided independently in FIG. 7A, but the JSDK platform 148 is provided in common for the JSDK applications 147 such as the Servlet 431, the JSP 432, the Applet 433 and the Xlet 434 in FIG. 7B. The software structure shown in FIG. 7A or FIG. 7B may be employed, but in this particular case, it is assumed that the software structure shown in FIG. 7B is employed.

In the following, a description will be given of the JSDK applications 147 and the JSDK platform 148, and a description will thereafter be given of the Applet 433, the Xlet 434 and the Java stand-alone application that display the operation screen for operating the MFP 101 shown in FIG. 1 on the screen of the MFP 101 (screen on the operation panel 202 shown in FIG. 2) or the operation screen for operating the terminal equipment on the screen of the terminal equipment (screen of the PC 401 shown in FIG. 5).

Figure 8:
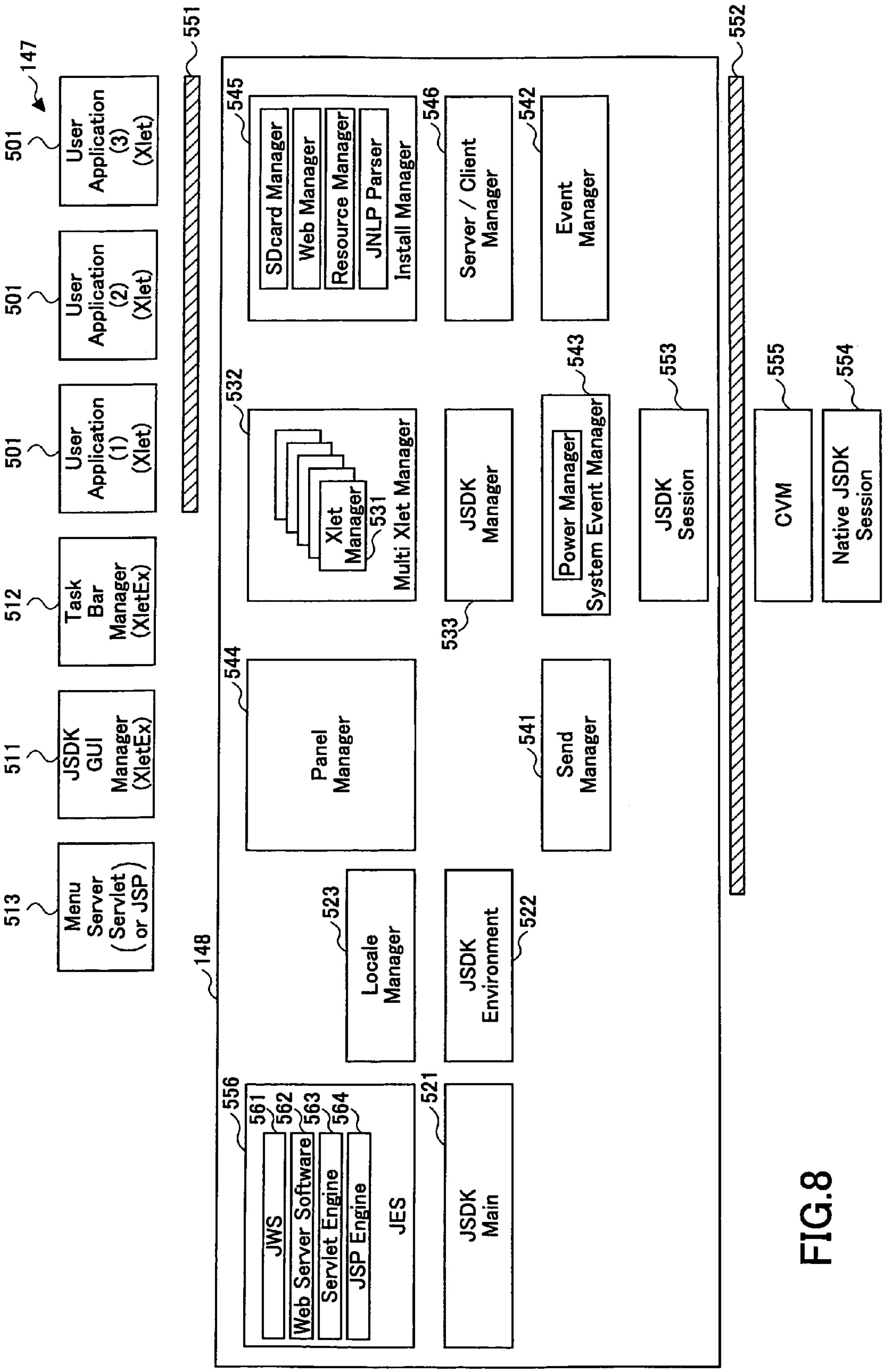
FIG. 8 is a diagram showing classes of a JSDK application and a JSDK platform.

FIG. 8 is a diagram showing classes of the JSDK application 147 and the JSDK platform 148 shown in FIG. 1. The JSDK application 147 and the JSDK platform 148 are regarded as one process as a whole and executed in the same process. Each block of the JSDK application 147 and the JSDK platform 148 is regarded as a thread of this one process, and executed in parallel in units of threads (executed in multi-thread). The JSDK application 147 and the JSDK platform 148 are translated together from a source code into a byte code by a Java compiler, and are successively executed by a Java virtual machine. The JSDK application 147 and the JSDK platform 148 is implemented based on the Personal Basis Profile of the Java 2 Micro Edition.

The JSDK applications 147 include user applications 501, a JSDK GUI Manager 511, a Task Bar Manager 512, and a Menu Server 513.

The user application 501 is a JSDK application that is developed by the user (for example, the vender) of the MFP 101 using the JSDK. The JSDK GUI Manager 511 is a JSDK application that displays an operation screen which regards another JSDK application (user application 501 or the like) as the operating target. The Task Bar Manager 512 is a JSDK application that displays a task bar which regards another JSDK application (user application 501 or the like) as the operating target. The Menu Server 513 is the Servlet 431 and the JSP 432 that display a menu page which regards the Applet 433 and the Xlet 434 as the operating targets.

The user application 501 in this case is an Xlet. The JSDK GUI Manager 511 in this case is an Xlet that has been subjected to a particular extension and extended (XletEx). The Menu Server 513 in this case is the Servlet and the JSP.

The JSDK platform 148 includes classes such as a JSDK Main 521, a JSDK Environment 522, a Local Manager 523, an Xlet Manager 531, a Multi Xlet Manager 532, a JSDK Manager 533, a Send Manager 541, an Event Manager 544, a System Event Manager 543, a Panel Manager 544, an Install Manager 545, and a Server/Client Manager 546.

The JSDK Main 521 is a class for making a start setting of the JSDK system. The JSDK Environment 522 is a class for making a start environment setting of the JSDK system. The Local Manager 523 is a class for coping with internationalization (language selection).

The Xlet manager 531 is a class for managing a life cycle of the Xlet in a 1:1 correspondence. In this particular case, the life cycle of 5 Xlets are managed by 5 Xlet Managers 531 in a 1:1 correspondence. The Multi Xlet Manager 532 is a class for managing the life cycle of all of the Xlet Managers 531. In this particular case, the life cycle of all of the 5 Xlet Managers 531 are managed by a single Multi Xlet Manager 532. The JSDK Manager 533 is a class for managing the life cycle of the entire JSDK system. For example, the life cycles of the Multi Xlet Manager 532, the Send Manager 541, the Event Manager 542, the System Event Manager 543, the Panel Manager 544, the Install Manager 545 and the Server/Client Manager 546 are managed by the JSDK Manager 533.

The System Event Manager 543 is a class for managing system events (for example, a power mode) from the platform 132 shown in FIG. 1. The Panel Manager 544 is a class for making an arbitration or the like when a single Xlet occupies the screen of the operation panel 202. The Install Manager 545 is a class for managing installing and uninstalling from an SD card (or SD memory card) and the Web.

In the JSDK system shown in FIG. 8, a JSDK API 551 and a JSDK API 552 are used as the APIs. The differences between the Xlet and the XletEx include the accessibility to the JSDK platform 148 and the capability to use the JSDK API 551 when accessing an object for the XletEx. The MFP 101 shown in FIG. 1 further includes, as elements related to the JSDK system shown in FIG. 8, a JSDK Session 553 and a Native JSDK Session 554 that provide an interface between the C language and the Java language, a CVM 555 which is a Java virtual machine for executing the JSDK application 147 and the JSDK platform 148, and a JES 556 for the Web server. The JES 556 includes a JWS 561 for the Web client, a Web server software 562 for the Web server, a Servlet Engine 563 for the Web server, and a JSP Engine 564 for the Web server.

Figure 9:
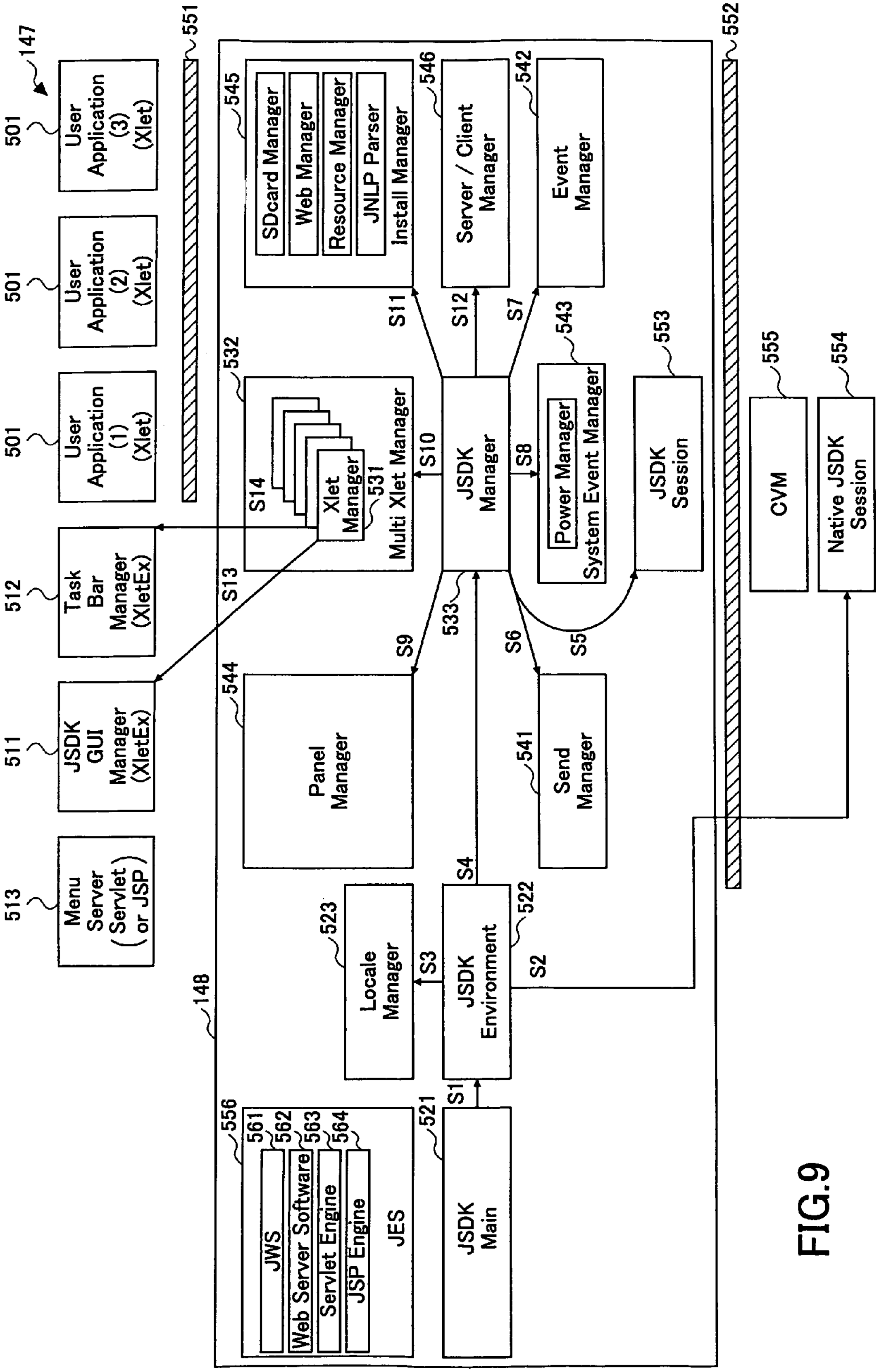
FIG. 9 is a diagram for explaining a start procedure of a JSDK system.

FIG. 9 is a diagram for explaining a start procedure of the JSDK system. First, in the JSDK system, the JSDK Main 521, which is the class having a main ( ) function that starts the JSDK application 147, generates the JSDK Environment 522 (step S1). Then, the JSDK Environment 522 carries out structuring of the Native layer (step S2) and structuring of the language environment (step S3), to carry out the structuring of the execution environment of the JSDK system. Next, the JSDK Environment 522 generates the JSDK Manager 533 (step S4). In the JSDK system, the JSDK Manager 533 generates the Manager of the system layer (steps S5-12), and generates the Manager of the application layer (steps S13-14) via the Multi Xlet Manager 532 and the Xlet Manager 531.

FIGS. 10A through 10E are diagrams for explaining the GUI of the JSDK system. When the function key 315 shown in FIG. 4 of the MFP 101 is pushed, steps S1 through S14 shown in FIG. 9 are carried out, and the GUIs shown in FIGS. 10A through 10E are displayed on the touch panel 311 shown in FIG. 4 of the MFP 101. The GUIs shown in FIGS. 10A through 10E are operation screens having the user application 501 as the operating target, and is displayed by the JSDK GUI Manager 511 that is started in the step S13 shown in FIG. 9.

Figure 10E:
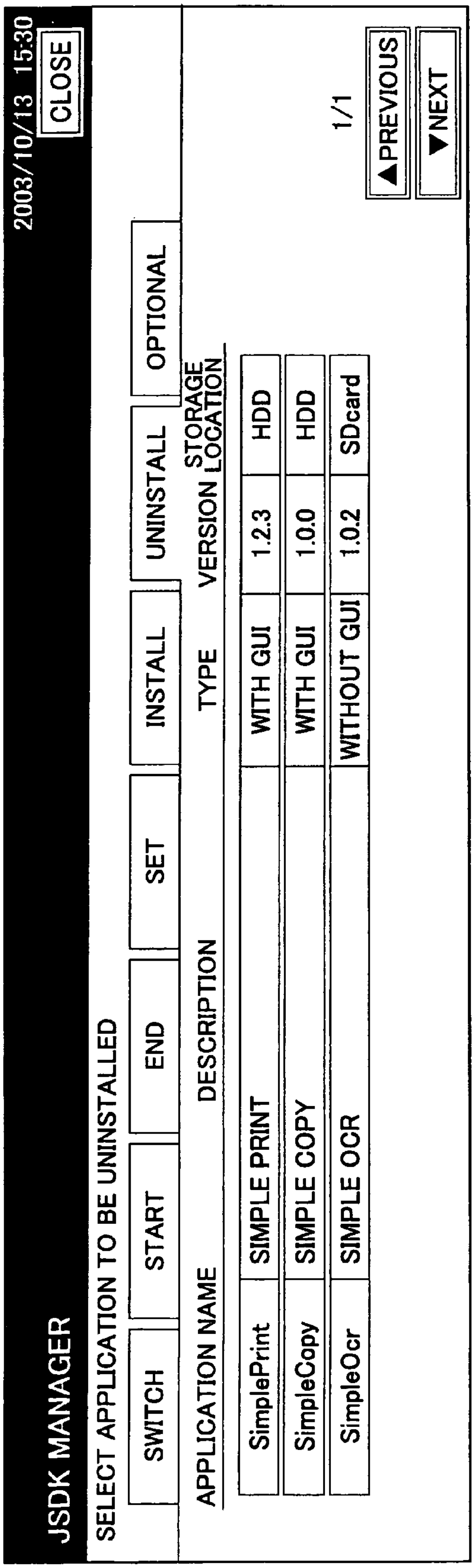

FIG. 10A shows a switch operation screen for carrying out a switch operation to switch the user application 501 that occupies the screen. FIG. 10B shows a start operation screen for carrying out a start operation to start the user application 501. FIG. 10C shows an end operation screen for carrying out an end operation to end the user application 501. FIG. 10D shows an install operation screen for carrying out an install operation to install the user application 501. FIG. 10E shows an uninstall operation screen for carrying out an uninstall operation to uninstall the user application 501. FIG. 10A is the initial screen that is displayed on the touch panel 311 immediately after the function key 315 is pushed. The screens shown in FIGS. 10A through 10E are respectively displayed when switch, start, end, install and uninstall buttons are pushed (or touched).

In FIGS. 10A through 10E, SimplePrint, SimpleCopy, SimpleOcr and SimpleScan are the user applications 501.

Figure 11:
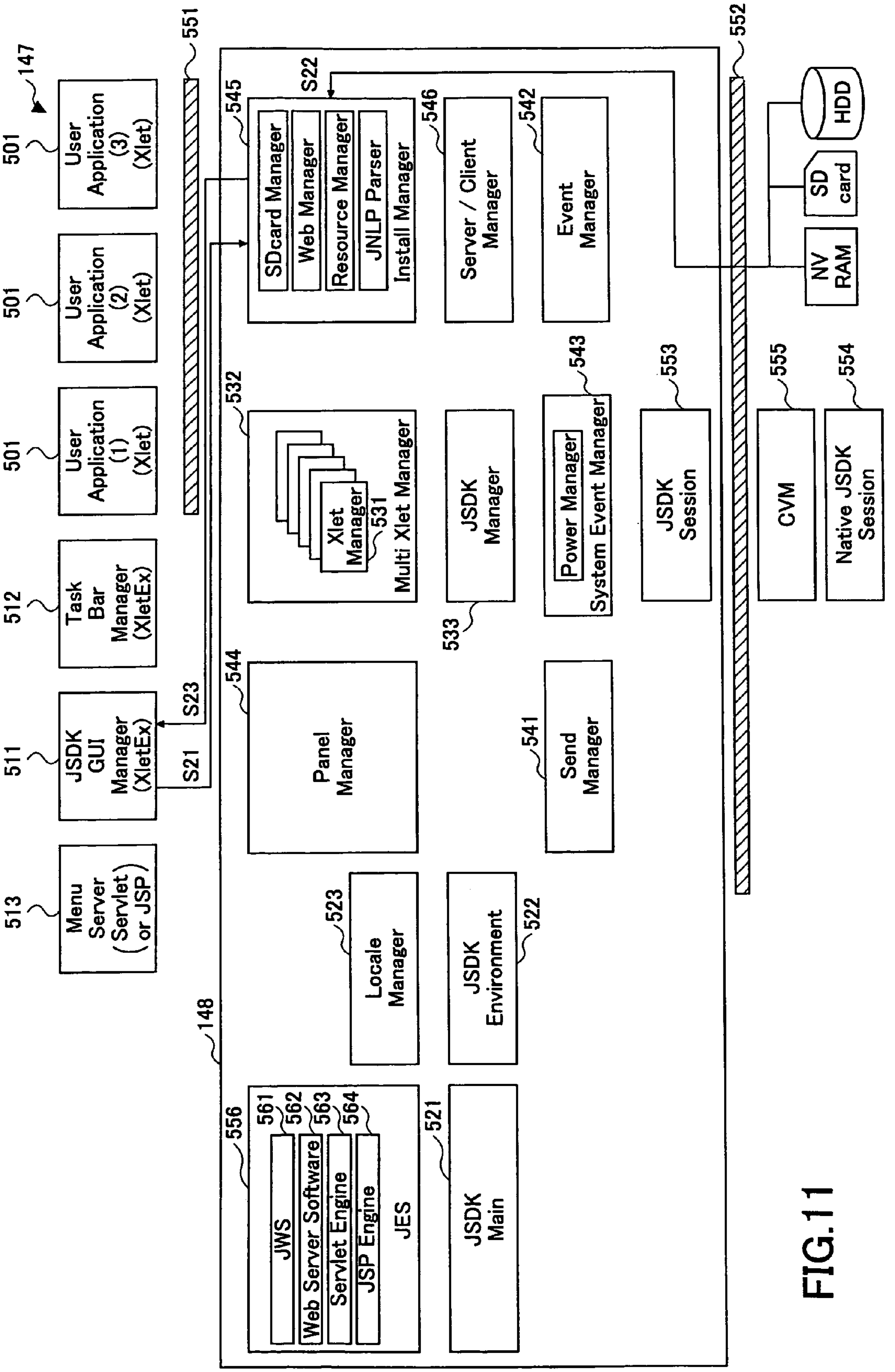
FIG. 11 is a diagram for explaining a display procedure of a start operation screen.

FIG. 11 is a diagram for explaining a display procedure of the start operation screen. When the start button is pushed on the switch operation screen, a list request requesting a list of the installed user applications 501 is sent from the JSDK GUI Manager 511 to the Install Manager 545 (step S21). Responsive to this list request, the Install Manager 545 acquires Java Network Launching Protocol (JNLP) files of the installed user applications 501 (step S22), based on information related to storage locations of the installed user applications 501 (stored in an NVRAM within the MFP 101). The JNLP files of the user applications 501, within the SD card that is set in the MFP 101, are acquired from the SD card. The JNLP files of the user applications 501, within the HDD, are acquired from the HDD. The JNLP files correspond 1:1 with respect to the user applications 501, and include information related to the definitions of the user applications 501. Based on the contents of the JNLP files of the installed user applications 501, a list response indicating the list of the installed user applications 501, is sent from the Install Manager 545 to the JSDK GUI Manager 511 (step S23). Hence, the screen makes a transition from the switch operation screen to the start operation screen.

Figure 12:
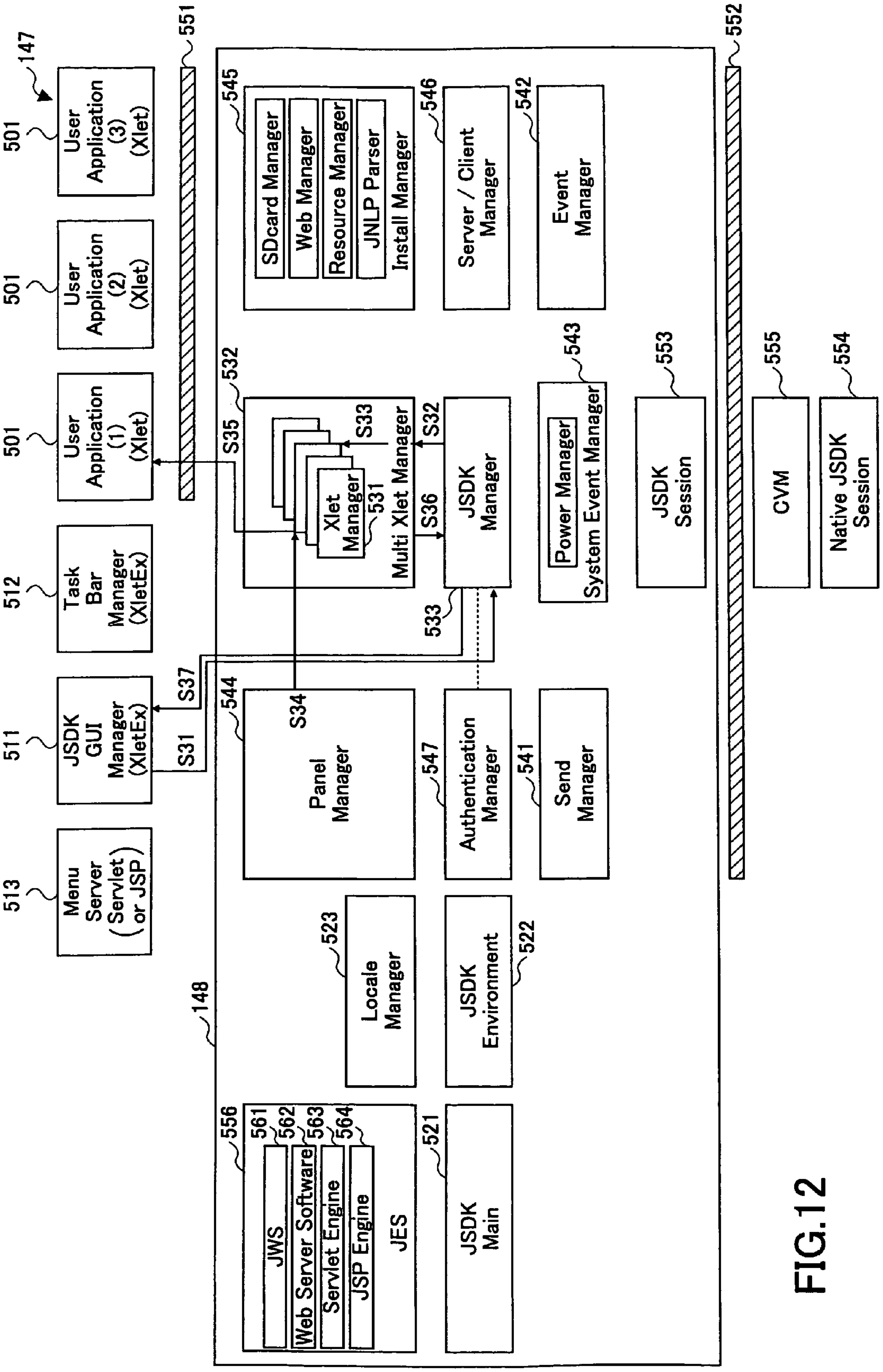
FIG. 12 is a diagram for explaining an executing procedure of a start process.

FIG. 12 is a diagram for explaining the executing procedure of the start process. When a select operation is carried out on the start operation screen and a confirm operation is carried out on a confirmation screen, a start request to request starting of the user application 501 is sent from the JSDK GUI Manager 511 to the JSDK Manager 533 (step S31). Responsive to this start request, the start request to request starting of the user application 501 is sent from the JSDK Manager 533 to the Multi Xlet Manager 532 via the authentication process of the Authentication manager 547 (step S32). Responsive to this start request, the Multi Xlet Manager 532 starts the Xlet Manager 531 (step S33), the Xlet Manager 531 acquires a root window from the Panel Manager 544 (step S34), and the Xlet Manager 531 starts the user application 501 (step S35). Then, a start response of the user application 501 is set from the Multi Xlet Manager 532 to the JSDK Manager 533 (step S36). In addition, the start response of the user application 501 is sent from the JSDK Manager 533 to the JSDK GUI Manager 511 (step S37).

Figure 13:
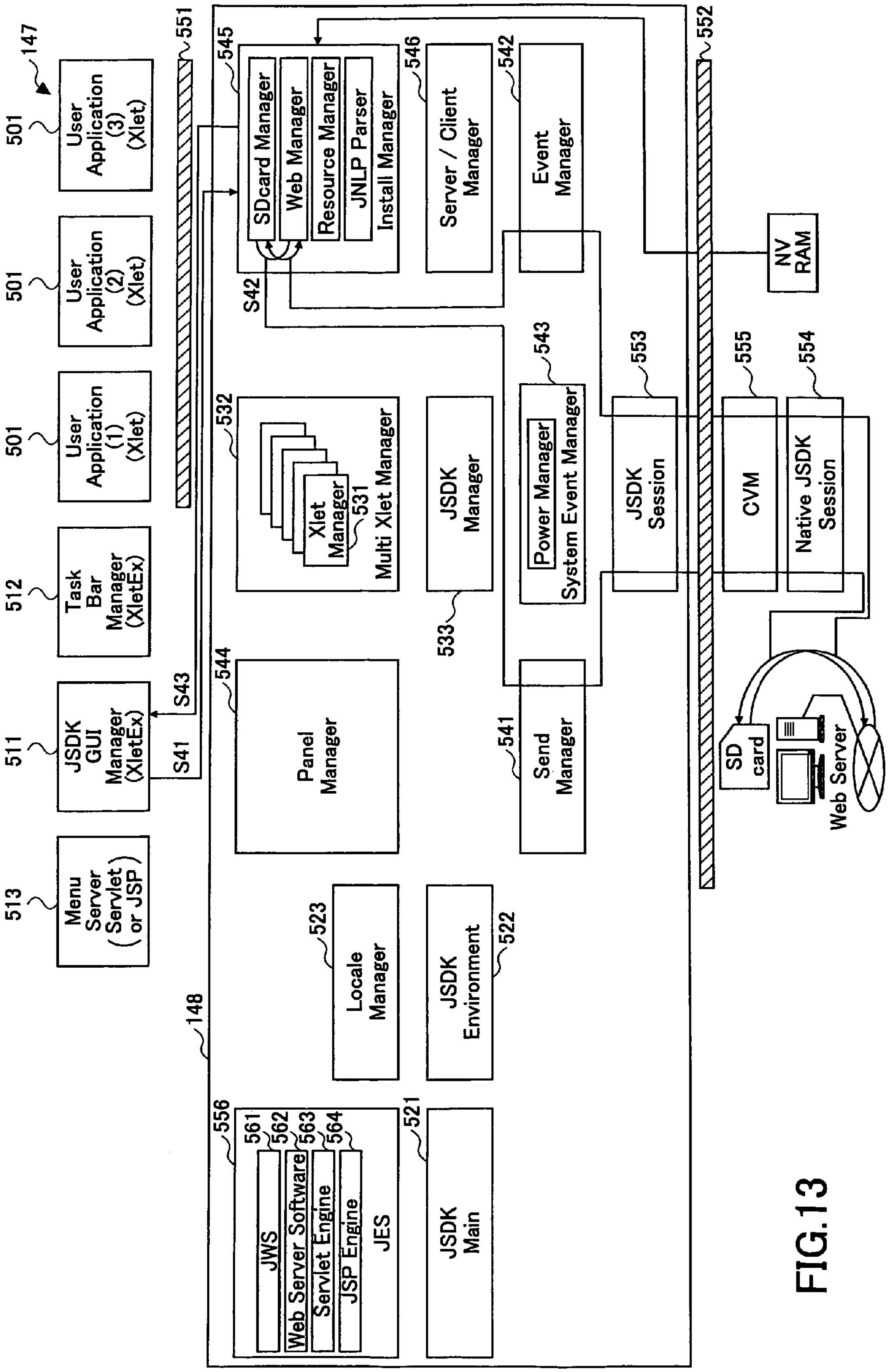
FIG. 13 is a diagram for explaining a display procedure of an install operation screen.

FIG. 13 is a diagram for explaining a display procedure of the install operation screen. When the install button on the switch operation screen is pushed, a list request to request the list of the user applications 501 is sent from the JSDK GUI Manager 511 to the Install Manager 545 (step S41). Responsive to this list request, the Install Manager 545 acquires the JNLP files of the user applications 501 (step S42). The JNLP files of the user applications 501 are acquired from the SD card that is set in the MFP 101. The JNLP files of the user applications 501, within the SD card that is set in the MFP 101, are acquired from the SD card. The JNLP files of the user applications 501, within the Web server that is connected to the MFP 101 via the network, are acquired from the Web server. The JNLP files correspond 1:1 with respect to the user applications 501, and include information related to the definitions of the user applications 501. Based on the information related to the installed state of the user applications 501 (stored in the NVRAM within the MFP 101) and the contents of the JNLP files of the user applications 501, a list response indicating the list of the user applications 501, is sent from the Install Manager 545 to the JSDK GUI Manager 511 (step S43). Hence, the screen makes a transition from the switch operation screen to the install operation screen.

Figure 14:
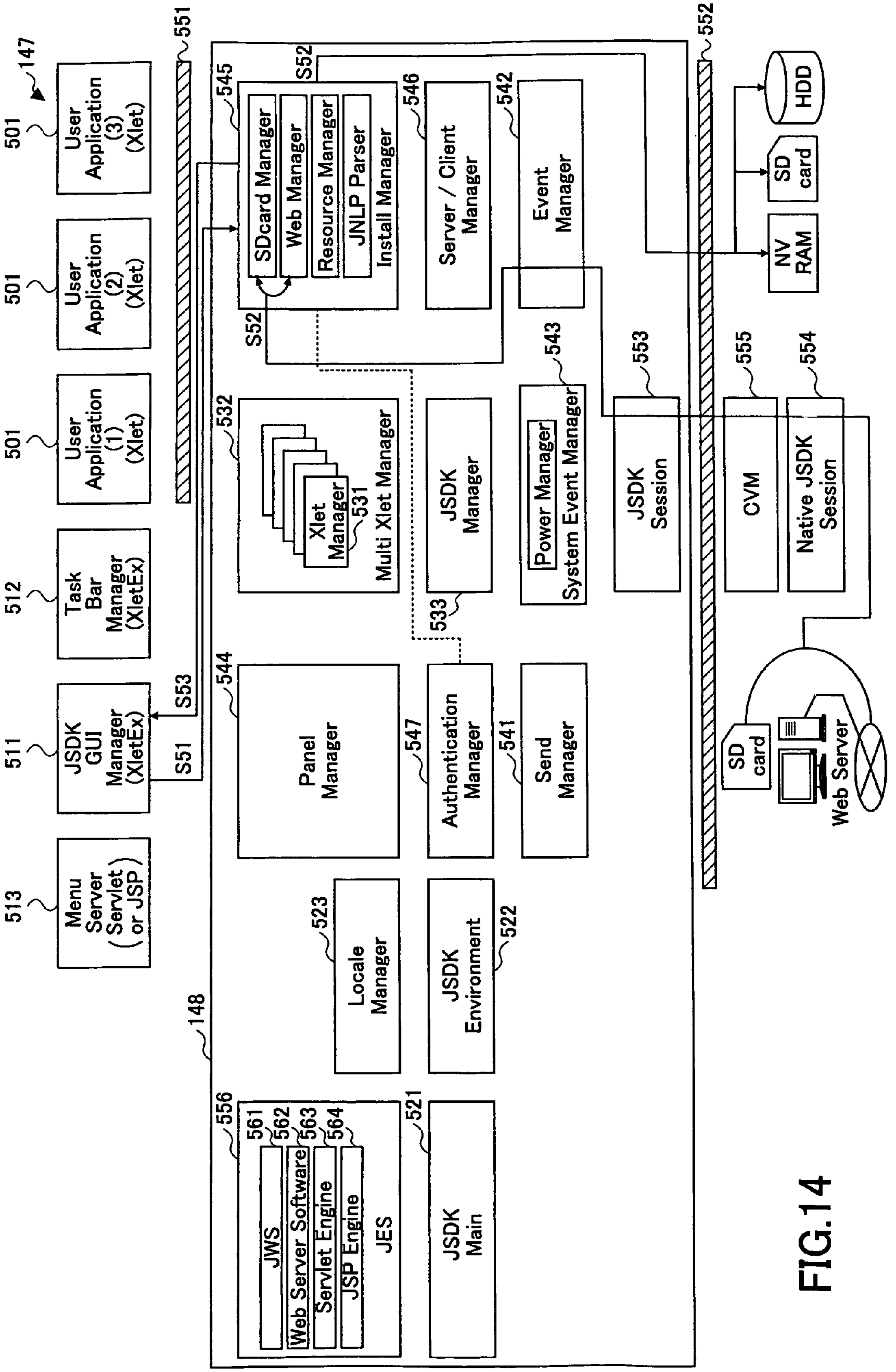
FIG. 14 is a diagram for explaining an executing procedure of an install process.

FIG. 14 is a diagram for explaining an executing procedure of the install process. When a select operation is carried out on the install operation screen and a confirm operation is carried out on the confirmation screen, an install request to request installing of the user application 501 is sent from the JSDK GUI Manager 511 to the Install Manager 545 (step S51). Responsive to this install request, the Install Manager 545 installs the user application 501 via the authentication process of the Authentication Manager 547 (step S52). Then, an install response of the user application 501 is sent from the Install Manager 545 to the JSDK GUI Manager 511 (step S53).

FIG. 15 is a diagram showing an example of a sentence structure of the JNLP file. The JNLP file is an eXtensible Markup Language (XML) file, and the JNLP file format is an eXtensible Markup Language (XML) file. The JNLP file format is in conformance with the JNLP standard. However, since the JNLP file has a portion that is peculiar thereto and is extended for the JSDK, a description will now be given of this extended portion.

A description 1 is an information element including a title element (description 1A) indicating an application name, a vender element (description 1B) indicating a vender name, a telephone element (description 1C) indicating a telephone number of the vender, a fax element (description 1D) indicating a facsimile telephone number of the vender, and a product ID element (description 1E) indicating a product ID of the application.

A description 2 is a security element.

A description 3 is a resource element including a jsdk element (description 3A) specifying a version of the JSDK, a jar element (description 3B) specifying a JAR file (executing file of the application) and a version thereof, and a sub-jnlp element (description 3C) specifying a SUB-JNLP file.

A description 4 is an update element for setting an executing method of an updating process. If the update element is "auto", the updating process of the application is executed by an automatic update. If the update element is "manual", the updating process of the application is executed by a manual update. If the update element is "mail" and the updating process of the application is executable, an update notification mail indicating that the updating process of the application is executable is distributed.

A description 5 is an install element for setting an executing method of the install process. If the install element is "auto", an installing destination of the application is selected by an automatic selection. If the install element is "manual", the installing destination of the application is selected by a manual selection.

A description 6 indicates whether the type of the application is "with GUI" or "without GUI".

Next, a description will be given of the Applet 433 and the Xlet 434 (may be a stand-alone application) shown in FIG. 6 that display on the screen of the MFP 101 shown in FIG. 1 or the screen of the terminal equipment such as the PC 401, the operation screen for operating the screen of the MFP 01 shown in FIG. 1 (screen of the operation panel 202 shown in FIG. 2) or the screen of the terminal equipment (screen of the PC 401 shown in FIG. 5). The screen of the operation panel 202 shown in FIG. 2 refers to the touch panel 311 shown in FIG. 4, and the screen of the PC 401 shown in FIG. 5 refers to the display 414 shown in FIG. 5.

(1) First Concrete Example

Figure 16:
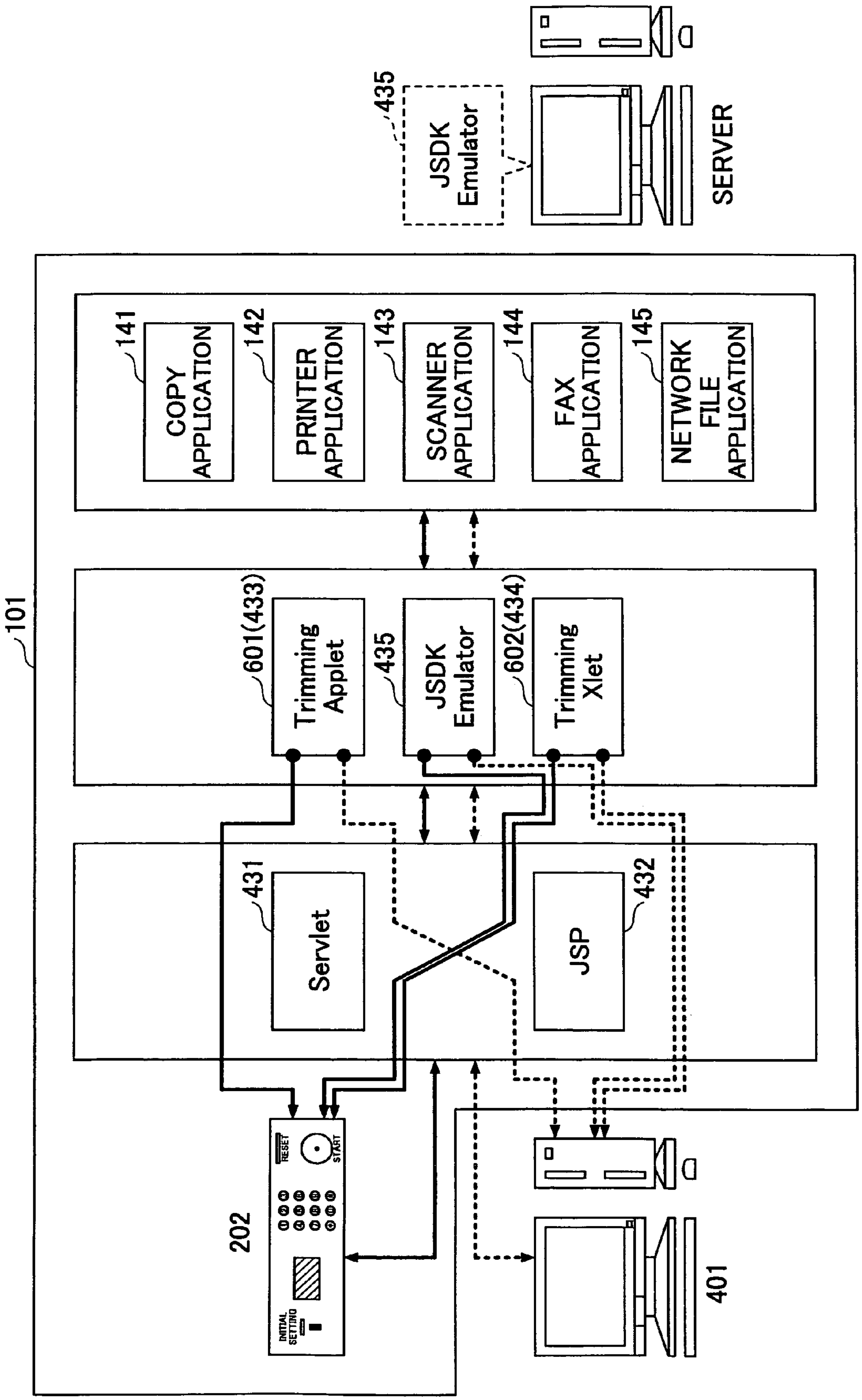
FIG. 16 is a diagram showing a software structure related to a first concrete example.

FIG. 16 is a diagram showing a software structure related to a first concrete example. A Trimming Applet 601 and a Trimming Xlet 602 for displaying on the screen of the operation panel 202 shown in FIG. 2 or the screen of the PC 401 shown in FIG. 5 an operation panel for carrying out an operation on the screen of the operation panel 202 or the screen of the PC 401 are provided in the MFP 101 shown in FIG. 16.

The Trimming Applet 601 is executed by the Web browser 181 shown in FIG. 1 or the Web browser 421 shown in FIG. 5 in the MFP 101 shown in FIG. 1 or the PC 401 shown in FIG. 5. On the operation screen that is displayed in this manner, it is possible to carry out an operation to make the MFP 101 shown in FIG. 1 execute a print process to print the image that is stored in this MFP 101. The images that are stored in the MFP 101 shown in FIG. 1 are displayed in the form of thumbnails on the operation screen. A print condition set process may be made to set a print condition with respect to the image stored in the MFP 101 by carrying out an edit operation on the operation screen with respect to the thumbnail that is displayed on the operation screen. The image stored in the MFP 101 may be trimmed by a touch-panel operation or a mouse operation with respect to a portion of the thumbnail that is displayed on the operation screen, so as to make a portion of the image stored in the MFP 101 a printing target.

The Trimming Xlet 602 is executed by the JWS 182 shown in FIG. 1 (or the JWS 561 shown in FIG. 8) or the JWS 422 shown in FIG. 5 in the MFP 101 shown in FIG. 1 or the PC 401 shown in FIG. 5. On the operation screen that is displayed in this manner, it is possible to carry out an operation to make the MFP 101 shown in FIG. 1 or the image forming apparatus other than the MFP 101 (such as the MFPs 101A, 101B and 101C and the printers 102A, 102B and 102C shown in FIG. 5) execute a print process to print the image that is stored in the MFP 101. The images that are stored in the MFP 101 shown in FIG. 1 are displayed in the form of thumbnails on the operation screen. A print condition set process may be made to set a print condition with respect to the image stored in the MFP 101 by carrying out an edit operation on the operation screen with respect to the thumbnail that is displayed on the operation screen. The image stored in the MFP 101 may be trimmed by a touch-panel operation or a mouse operation with respect to a portion of the thumbnail that is displayed on the operation screen, so as to make a portion of the image stored in the MFP 101 a printing target.

The Applet and the Xlet are a kind of Web application for the Web client. The Web application can be executed in various kinds of equipments and can control various kinds of equipments, and is an application having a high degree of freedom. For example, it is possible to use the Trimming Applet 601 and the Trimming Xlet 602 having the same specifications as applications for a plurality of models of the image forming apparatuses (among different models of MFPs, different models of printers, MFP and printer, etc.). In addition, by implementing the Trimming Applet 601 and the Trimming Xlet 602 for the MFP with a screen within the printer without a screen, for example, it is possible to realize on the display of the PC, as an operation screen of the printer, an operation screen in the form of the touch panel of the MFP.

The MFP 101 shown in FIG. 1 may be made to carry out the image forming process such as the print process from the operation screen that is displayed when the Trimming Applet 601 of the MFP shown in FIG. 1 is executed by the Web browser or, from the operation screen that is displayed when the Trimming Xlet 602 of the MFP 101 shown in FIG. 1 is executed by the JWS. However, of the former and latter operation screens, both the MFP 101 and the image forming apparatuses other than the MFP 101 can be made to carry out the image forming process such as the print process from only the latter operation screen. But even in the case of the latter operation screen, it is not unconditional, and it is necessary to provide the JSDK Emulator 435 that has a starting function to start the Xlet 434 and an absorbing function to absorb differences in the execution environment of the Xlet 434. The differences in the execution environment of the Xlet 434 to be absorbed by the absorbing function of the JSDK Emulator 435 include, for example, the differences in the execution environment based on functions or facilities peculiar to the image forming apparatus such as the functions or facilities related to the image forming process. Particular examples of the functions peculiar to the MFP 101 shown in FIG. 1 include the Application Program Interface (API) 133 between the application 131 and the platform 132, the JSDK API 551 shown in FIG. 8, and the JSDK API 552 shown in FIG. 8.

Figure 17:
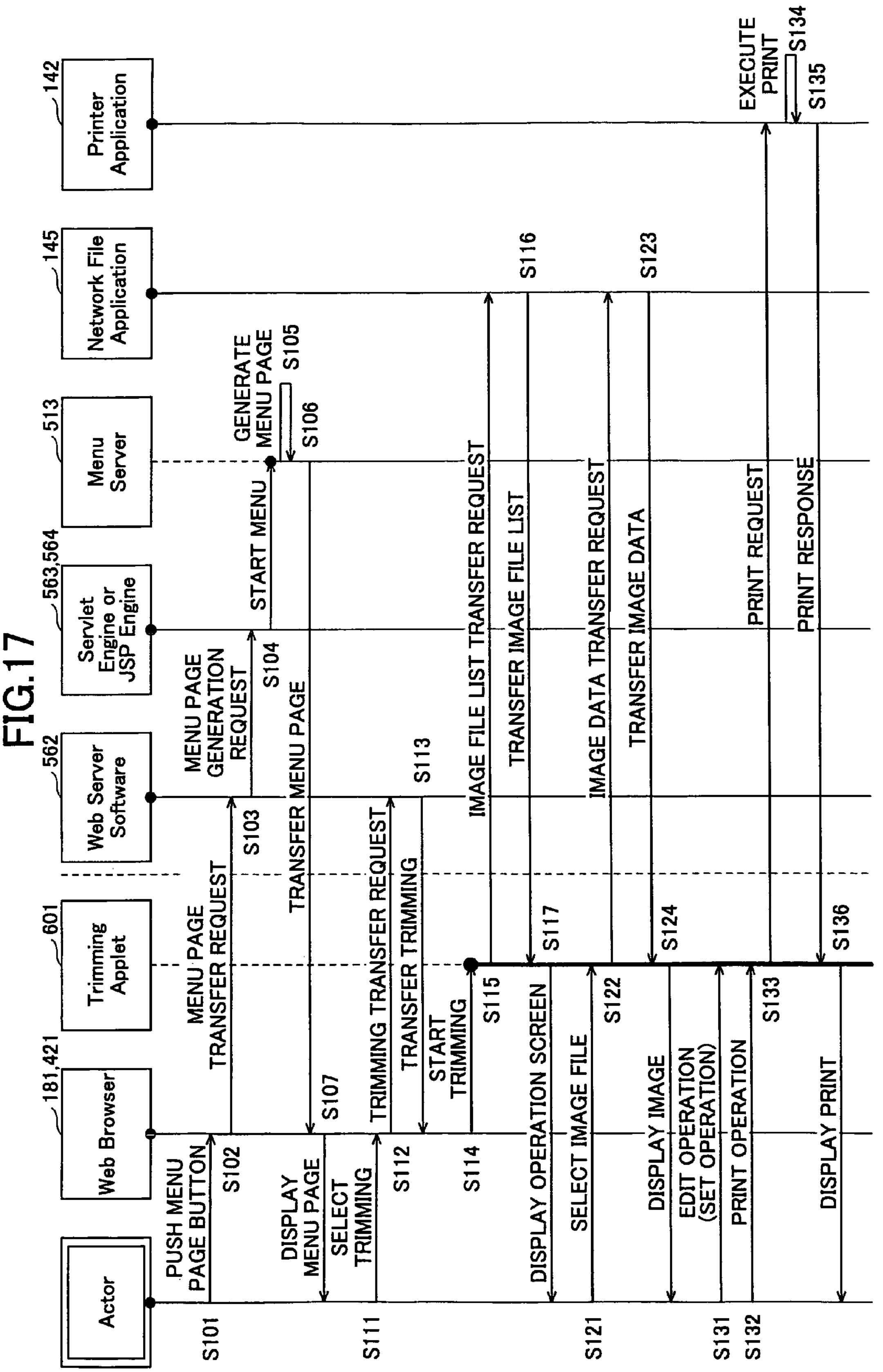
FIG. 17 is a sequence diagram related to a Trimming Applet.

FIG. 17 is a sequence diagram related to the Trimming Applet 601.

FIG. 17 shows the sequences for both cases, namely, the case where the MFP 101 shown in FIG. 1 functions as the Web server by regarding the MFP 101 itself (operation panel 202 shown in FIG. 2) as the Web client and the case where the MFP 101 shown in FIG. 1 functions as the Web server by regarding another equipment (PC 401 shown in FIG. 5) as the Web client. In the following description, the Web browser 181 and the Web browser 421 will simply be referred to as the Web browser 181 and the like. The JWS 182 and the JWS 422 will simply be referred to as the JWS 182 and the like. The Servlet Engine 563 and the JSP Engine 564 will simply be referred to as the Servlet Engine 563 and the like.

First, when a "menu page button" displayed on the screen of the operation panel 202 or the screen of the PC 401 by the Web browser 181 and the like is pushed (step S101), a "menu page" transfer request is sent from the Web browser 181 and the like to the Web server software 562 (step S102). Then, a "menu page" generation request is sent from the Web server software 562 to the Servlet Engine 563 and the like (step S103). The Servlet Engine 563 and the like starts the Menu Server 513 within the MFP 101 (step S104), and the Menu Server 513 generates a "menu page" (step S105). Further, the Menu Server 513 transfers the "menu page" to the Web browser 181 and the like (S106). The "menu page" is displayed on the screen of the operation panel 202 or the screen of the PC 401 by the Web browser 181 and the like (step S107). The "menu page" displays a list of the Applet 433 and the Xlet 434 that are stored in the MFP 101.

Next, when the "Trimming Applet 601" is selected from the list that is displayed in the menu page on the screen of the operation panel 202 or the screen of the PC 401 (step S111), a transfer request for the Trimming Applet 601 is sent from the Web browser 181 and the like to the Web server software 562 (step S112). Then, the Web server software 562 transfers the Trimming Applet 601 to the Web browser 181 and the like, as the Web server (step S113), and the Web browser 181 and the like starts the Trimming Applet 601 within the MFP 101 or the PC 401, as the Web client (step S114). The Trimming Applet 601 sends a transfer request for the list of the "image files" to the network file application 145 (step S115). The list of the "image files" is transferred from the network file application 145 to the Trimming Applet 601 (step S116). The Trimming Applet 601 displays the operation screen on the screen of the operation panel 202 or the screen of the PC 401 (step S117). The list of the "image files" stored in the MFP 101 is displayed on the operation screen. On the operation screen, it is possible to carry out an operation to make the MFP 101 execute the print process with respect to the "image files" stored in the MFP 101.

Then, when an arbitrary "image file" is selected from the list that is displayed on the operation screen on the screen of the operation panel 202 or the screen of the PC 401 (step S121), the Trimming Applet 601 sends a transfer request for the image data of the selected "image file" to the network file application 145 (step S122). The network file application 145 transfers the image data of the selected "image file" to the Trimming Applet 601 (step S123). The image of the selected "image file" is displayed on the operation screen by the Trimming Applet 601 on the screen of the operation panel 202 or the screen of the PC 401 (step S124).

Next, when an edit operation of the "image" displayed on the operation screen (set operation to set the print condition of this "image" stored in the MFP 101) is carried out on the screen of the operation panel 202 or the screen of the PC 401 (step S131), and an operation is carried out to make the MFP 101 execute a print process with respect to this "image" stored in the MFP 101 (step S132), the Trimming Applet 601 sends a print request for the print process of this "image" to the printer application 142 (step S133). The printing of this "image" is executed by the MFP 101 (step S134). The printer application 142 sends a print response with respect to the print process of this "image" to the Trimming Applet 601 (step S135). Finally, a display indicating that the printing of this "image" has been executed by the MFP 101 is made on the operation screen, on the screen of the operation panel 202 or the screen of the PC 401 (step S136).

Figure 18:
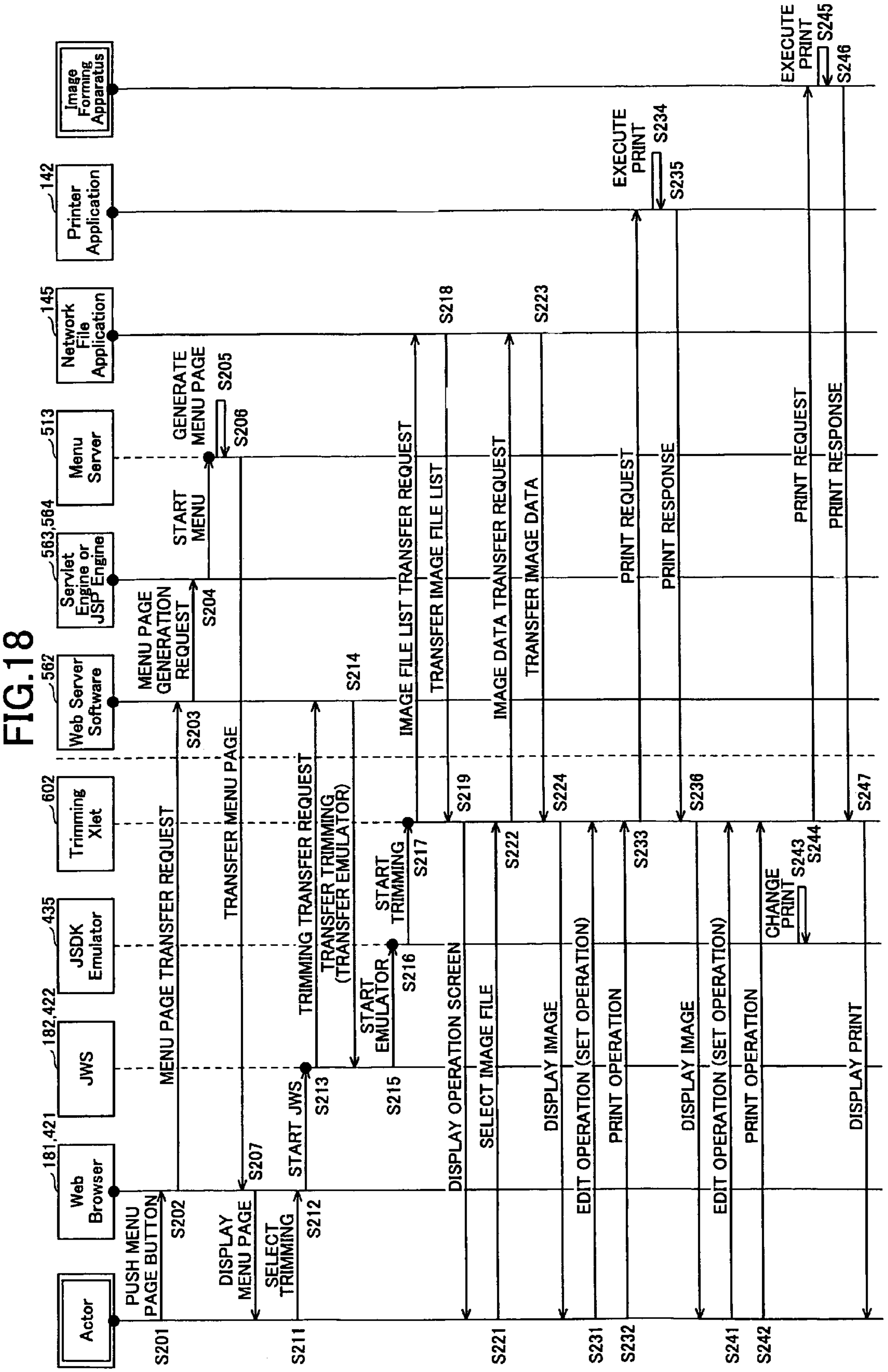
FIG. 18 is a sequence diagram related to a Trimming Xlet.

FIG. 18 is a sequence diagram related to the Trimming Xlet 602.

FIG. 18 shows the sequences for both cases, namely, the case where the MFP 101 shown in FIG. 1 functions as the Web server by regarding the MFP 101 itself (operation panel 202 shown in FIG. 2) as the Web client and the case where the MFP 101 shown in FIG. 1 functions as the Web server by regarding another equipment (PC 401 shown in FIG. 5) as the Web client. In the following description, the Web browser 181 and the Web browser 421 will simply be referred to as the Web browser 181 and the like. The JWS 182 and the JWS 422 will simply be referred to as the JWS 182 and the like. The Servlet Engine 563 and the JSP Engine 564 will simply be referred to as the Servlet Engine 563 and the like.

First, when a "menu page button" displayed on the screen of the operation panel 202 or the screen of the PC 401 by the Web browser 181 and the like is pushed (step S201), a "menu page" transfer request is sent from the Web browser 181 and the like to the Web server software 562 (step S202). Then, a "menu page" generation request is sent from the Web server software 562 to the Servlet Engine 563 and the like (step S203). The Servlet Engine 563 and the like starts the Menu Server 513 within the MFP 101 (step S204), and the Menu Server 513 generates a "menu page" (step S205). Further, the Menu Server 513 transfers the "menu page" to the Web browser 181 and the like (S206). The "menu page" is displayed on the screen of the operation panel 202 or the screen of the PC 401 by the Web browser 181 and the like (step S207). The "menu page" displays a list of the Applet 433 and the Xlet 434 that are stored in the MFP 101.

Next, when the "Trimming Xlet 602" is selected from the list that is displayed in the menu page on the screen of the operation panel 202 or the screen of the PC 401 (step S211), the Web browser 181 and the like starts the JWS 182 and the like within the MFP 101 or within the PC 401 (step S212). A transfer request for the Trimming Xlet 602 is sent from the JWS 182 and the like to the Web server software 562 (step S213). Then, the Web server software 562 transfers the Trimming Xlet 602 and the JSDK Emulator 435 (stored in the MFP 101 shown in FIG. 1 or stored in the server shown in FIG. 6)

to the JWS 182 and the like, as the Web server (step S214), and the JWS 182 and the like starts the JSDK Emulator 435 within the MFP 101 or the PC 401, as the Web client (step S215), and the JSDK Emulator 435 starts the Trimming Xlet 602 within the MFP 101 or the PC 401 (step S216). The Trimming Xlet 602 sends a transfer request for the list of the "image files" to the network file application 145 (step S217). The list of the "image files" is transferred from the network file application 145 to the Trimming Xlet 602 (step S218). The Trimming Xlet 602 displays the operation screen on the screen of the operation panel 202 or the screen of the PC 401 (step S219). The list of the "image files" stored in the MFP 101 is displayed on the operation screen. On the operation screen, it is possible to carry out an operation to make the MFP 101 execute the print process with respect to the "image files" stored in the MFP 101.

Then, when an arbitrary "image file" is selected from the list that is displayed on the operation screen on the screen of the operation panel 202 or the screen of the PC 401 (step S221), the Trimming Xlet 602 sends a transfer request for the image data of the selected "image file" to the network file application 145 (step S222). The network file application 145 transfers the image data of the selected "image file" to the Trimming Xlet 602 (step S223). The image of the selected "image file" is displayed on the operation screen by the Trimming Xlet 602 on the screen of the operation panel 202 or the screen of the PC 401 (step S224).

Next, a description will be given of a case where the MFP 101 is made to execute a print process with respect to the "image" stored in the MFP 101.

First, when an edit operation of the "image" displayed on the operation screen (set operation to set the print condition of this "image" stored in the MFP 101) is carried out on the screen of the operation panel 202 or the screen of the PC 401 (step S231), and an operation is carried out to make the MFP 101 execute a print process with respect to this "image" stored in the MFP 101 (step S232), the Trimming Xlet 602 sends a print request for the print process of this "image" to the printer application 142 (step S233). The printing of this "image" is executed by the MFP 101 (step S234). The printer application 142 sends a print response with respect to the print process of this "image" to the Trimming Xlet 602 (step S235). Finally, a display indicating that the printing of this "image" has been executed by the MFP 101 is made on the operation screen, on the screen of the operation panel 202 or the screen of the PC 401 (step S236).

Next, a description will be given of a case where the print process with respect to the "image" stored in the MFP 101 is executed by an image forming apparatus (or equipment) other than the MFP 101.

First, when an edit operation of the "image" displayed on the operation screen (set operation to set the print condition of this "image" stored in the MFP 101) is carried out on the screen of the operation panel 202 or the screen of the PC 401 (step S241), and an operation is carried out to make an arbitrary image forming apparatus other than the MFP 101 execute a print process with respect to this "image" stored in the MFP 101 (step S242), the JSDK Emulator 435 changes the print destination from the MFP 101 to the arbitrary image forming apparatus (step S243). Then, the Trimming Xlet 602 sends a print request for the print process of this "image" to the arbitrary image forming apparatus (step S244). The printing of this "image" is executed by the arbitrary image forming apparatus (step S245). The arbitrary image forming apparatus sends a print response with respect to the print process of this "image" to the Trimming Xlet 602 (step S246). Finally, a display indicating that the printing of this "image" has been executed by the arbitrary image forming apparatus is made on the operation screen, on the screen of the operation panel 202 or the screen of the PC 401 (step S247).

The JSDK Emulator 435 has the starting function to start the Xlet 434 and the absorbing function to absorb differences in the execution environment of the Xlet 434. The JSDK Emulator 435 starts the Trimming Xlet 602 in the step S216 shown in FIG. 18, which corresponds to the starting function in FIG. 19. The JSDK Emulator 435 absorbs the differences in the execution environment of the Trimming Xlet 602 by becoming a communication interface between the Trimming Xlet 602 and other blocks in the step S216 and subsequent steps shown in FIG. 18, which corresponds to the absorbing function in FIG. 19. The communication between the Trimming Xlet 602 and the other blocks is made via the JSDK Emulator 435 in the step S216 and each of the subsequent steps (steps S217, S218, S219, etc.) shown in FIG. 18, but the illustration thereof is omitted in FIG. 18 for the sake of convenience.

Figure 19:
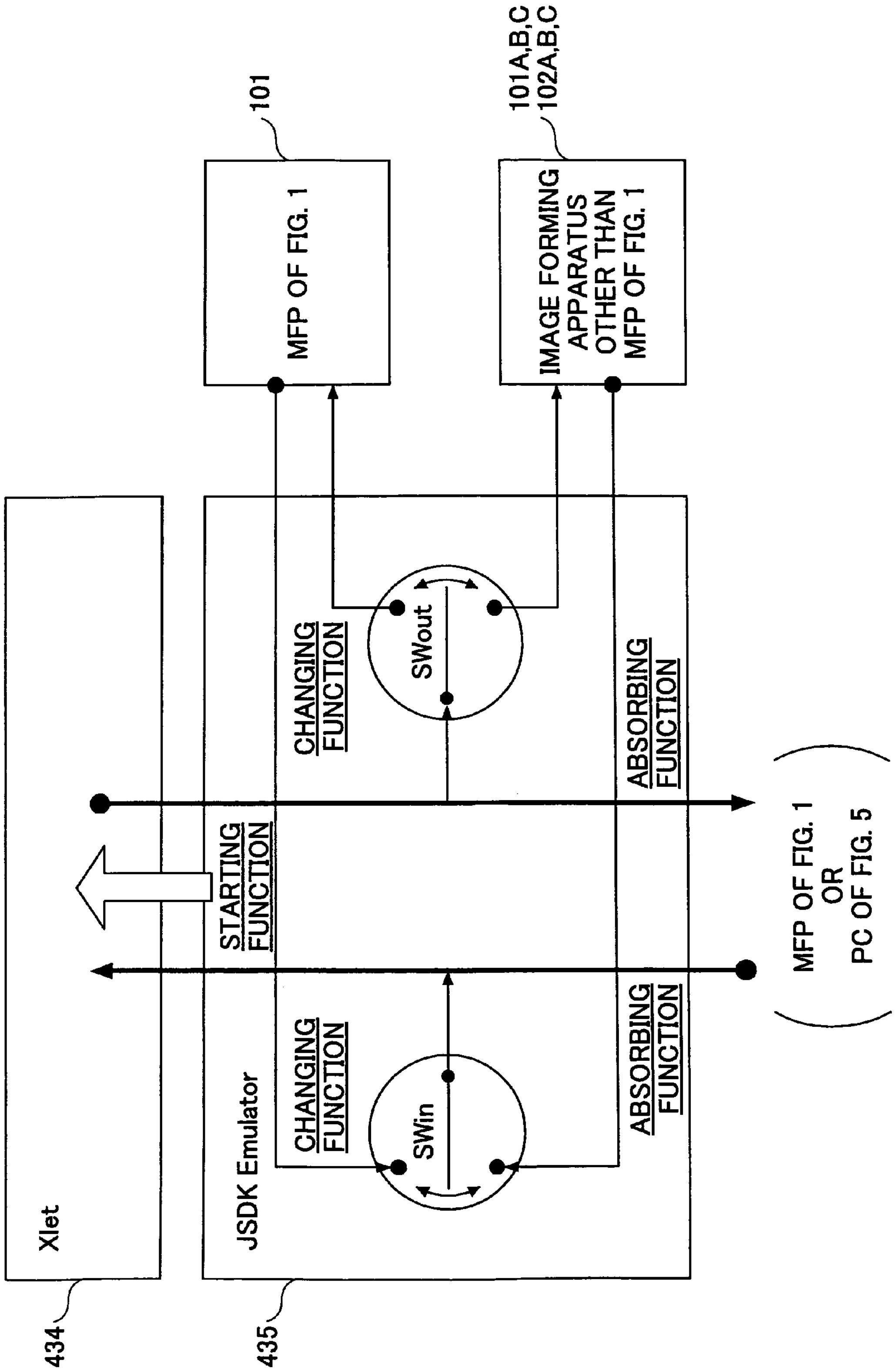
FIG. 19 is a diagram for explaining a JSDK Emulator.

In addition, the JSDK Emulator 435 has the changing function to change the communication destination of the Xlet 434. The JSDK Emulator 435 changes the print destination from the MFP 101 shown in FIG. 1 to the image forming apparatus other than the MFP 101 shown in FIG. 1 in the step S243 shown in FIG. 18, which corresponds to the changing function in FIG. 19. As shown in FIG. 19, the JSDK Emulator 435 includes an input changing part SWin and an output changing part SWout, as blocks related to the changing function to change the communication destination of the Xlet 434. The input changing part SWin functions as a switch to change the input source of the input to the Xlet 434, and the output changing part SWout functions as a switch to change the output destination of the output from the Xlet 434. Although the JSDK Emulator 435 is described as being the same with respect to the equipment in which the JSDK Emulator 435 is provided and with respect to the other equipment other than the equipment in which the JSDK Emulator 435 is provided, the absorbing function to absorb the differences in the execution environment of the Xlet 434 may be limited with respect to the other equipment. In this case, the JDSK Emulator 435 may be provided with respect to both the equipment and the other equipment, but the JSDK Emulator 435 provided with respect to the equipment in which the JSDK Emulator 435 is provided will have the changing function but does not necessarily have the starting function and the absorbing function.

(2) Second Concrete Example

Figure 20:
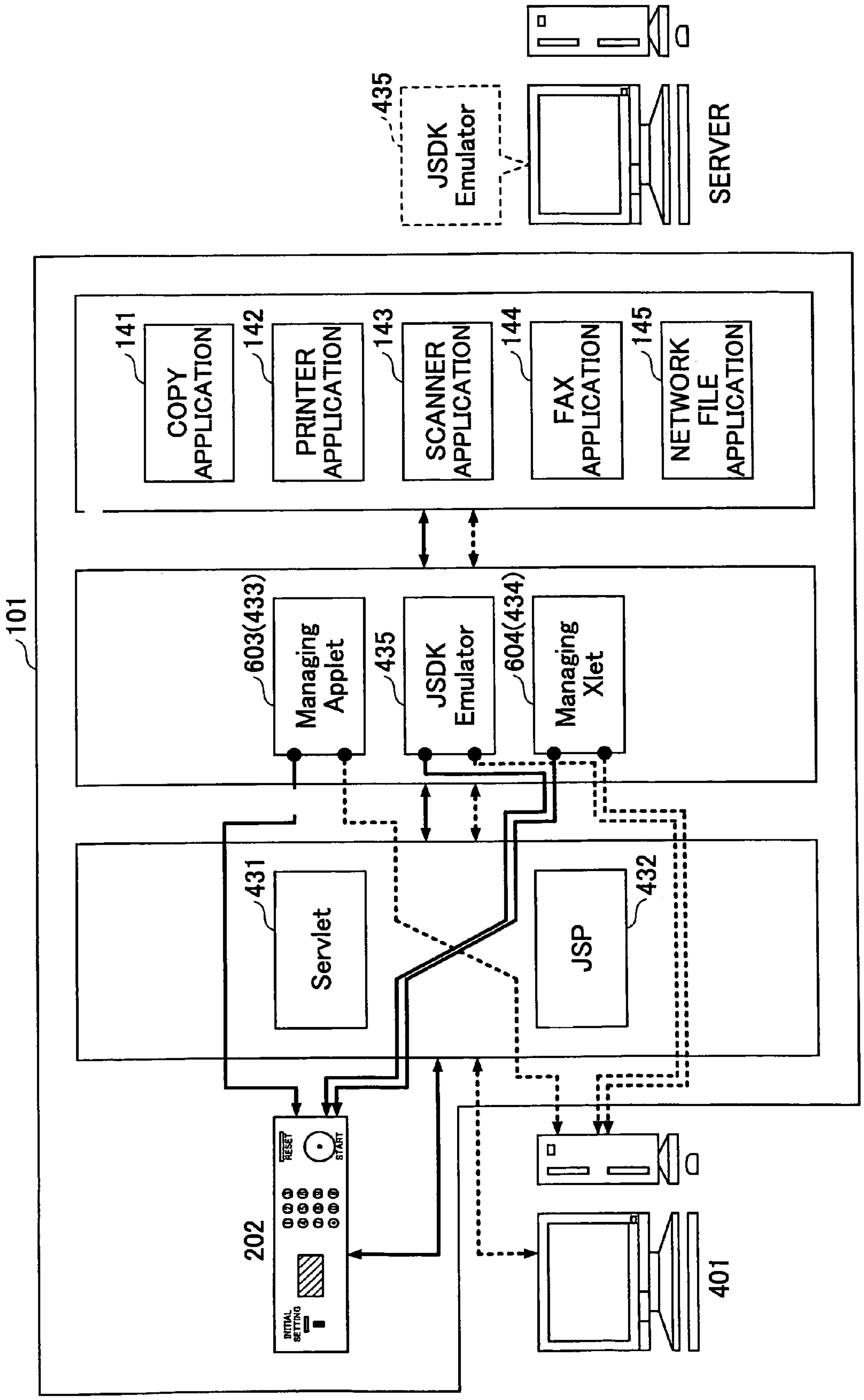
FIG. 20 is a diagram showing a software structure related to a second concrete example.

FIG. 20 is a diagram showing a software structure related to a second concrete example. A Managing Applet 603 and a Managing Xlet 604 for displaying on the screen of the operation panel 202 shown in FIG. 2 or the screen of the PC 401 shown in FIG. 5 an operation panel for carrying out an operation on the screen of the operation panel 202 or the screen of the PC 401 are provided in the MFP 101 shown in FIG. 20. A description of those parts that are the same as those corresponding parts of the first concrete example described above will be omitted.

The Managing Applet 603 is executed by the Web browser 181 shown in FIG. 1 or the Web browser 421 shown in FIG. 5 in the MFP 101 shown in FIG. 1 or the PC 401 shown in FIG. 5. On the operation screen that is displayed in this manner, it is possible to carry out an operation to make the MFP 101 shown in FIG. 1 install a program in the MFP 101 or execute a program in the MFP 101. The operation screens that are displayed are similar to the install operation screen shown in FIG. 10D and the start operation screen shown in FIG. 10B.

The Managing Xlet 604 is executed by the JWS 182 shown in FIG. 1 (or the JWS 561 shown in FIG. 8) or the JWS 422 shown in FIG. 5 in the MFP 101 shown in FIG. 1 or the PC 401 shown in FIG. 5. On the operation screen that is displayed in this manner, it is possible to carry out an operation to make the MFP 101 shown in FIG. 1 or the image forming apparatus other than the MFP 101 install a program in the MFP 101 shown in FIG. 1 or the image forming apparatus other than the MFP 101 or start a program in the MFP 101 shown in FIG. 1 or the image forming apparatus other than the MFP 101. The operation screens that are displayed are similar to the install operation screen shown in FIG. 10D and the start operation screen shown in FIG. 10B.

Figure 21A:
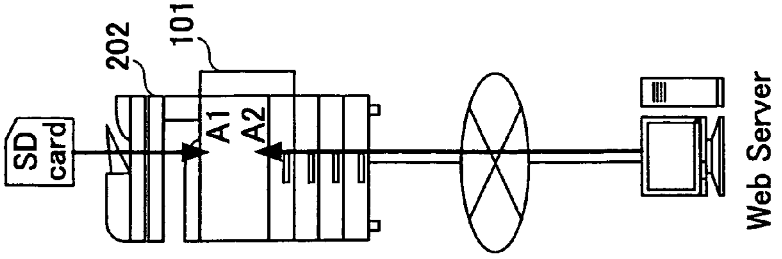
FIGS. 21A through 21C are diagrams for explaining a program install system of the second concrete example.
Figure 21B:
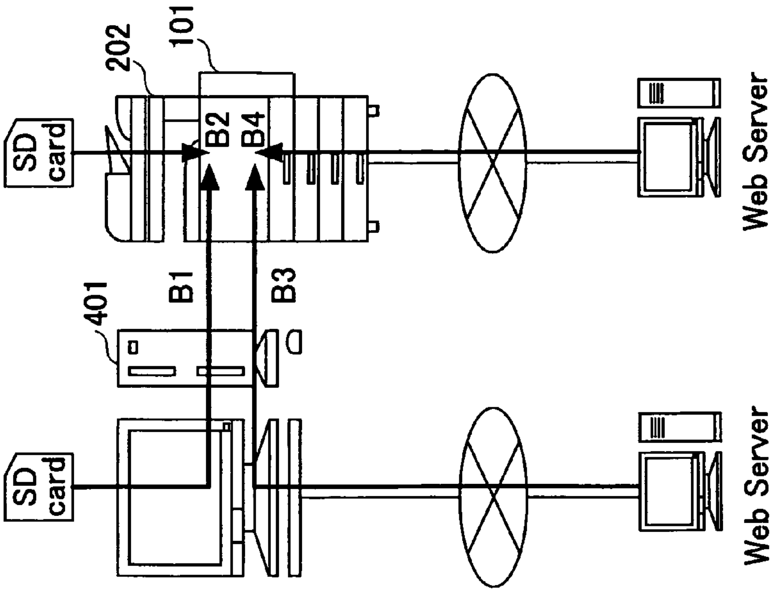
Figure 21C:
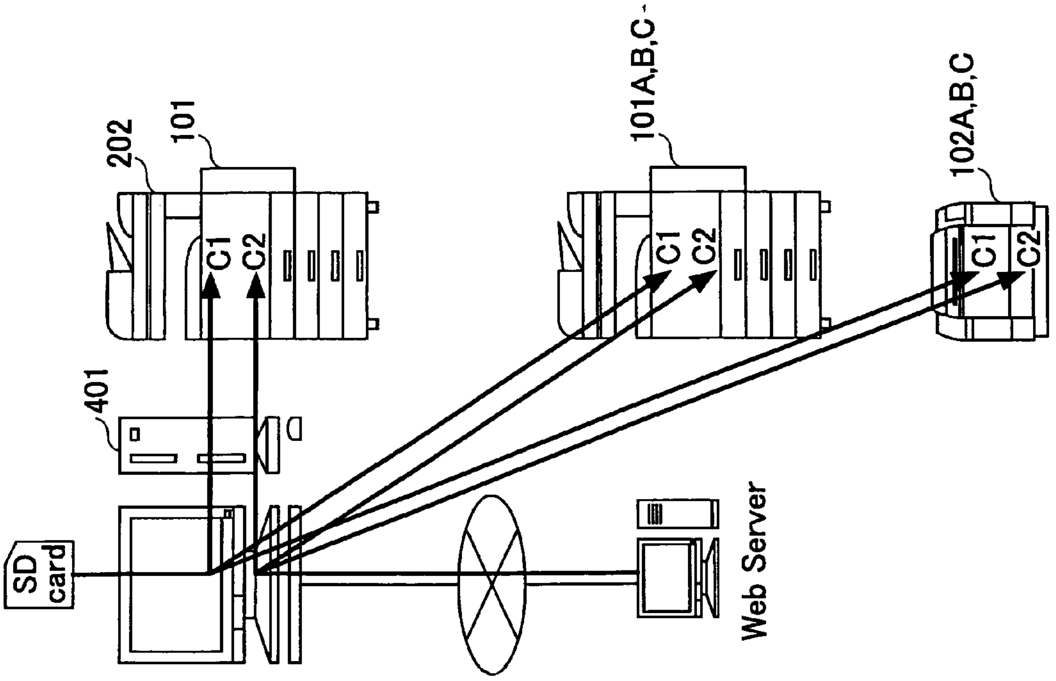

FIGS. 21A through 21C are diagrams for explaining a program install system of the second concrete example.

FIG. 21A shows a case where the operation to install the program in the MFP 101 shown in FIG. 1 is made from the operation screen that is displayed on the screen of the operation panel 202 shown in FIG. 2. The program can be installed in the MFP 101 shown in FIG. 1 from either the operation screen (also referred to as "MA operation screen on own equipment") that is displayed when the Managing Applet 603 of the MFP 101 shown in FIG. 1 is executed by the Web browser 181 shown in FIG. 1 or, the operation screen (also referred to as "MX operation screen on own equipment") that is displayed when the Managing Xlet 604 of the MFP 101 shown in FIG. 1 is executed by the JWS 182 shown in FIG. 1.

In FIG. 21A, A1 indicates a state where the program is installed in the MFP 101 shown in FIG. 1 from the SD card that is set in the MFP 101 shown in FIG. 1. This installing of the program from the SD card may be made from the MA operation screen on own equipment or the MX operation screen on own equipment. Further, A2 indicates a state where the program is installed in the MFP 101 shown in FIG. 1 from the Web server that is connected to the MFP 101 shown in FIG. 1 via a network. This installing of the program from the Web server may be made from the MA operation screen on own equipment or the MX operation screen on own equipment.

FIG. 21B shows a case where the operation to install the program in the MFP 101 shown in FIG. 1 is made from the operation screen that is displayed on the screen of the PC 401 shown in FIG. 5. The program can be installed in the MFP 101 shown in FIG. 1 from either the operation screen (also referred to as "MA operation screen on other equipment") that is displayed when the Managing Applet 603 of the MFP 101 shown in FIG. 1 is executed by the Web browser 421 shown in FIG. 5 or, the operation screen (also referred to as "MX operation screen on other equipment") that is displayed when the Managing Xlet 604 of the MFP 101 shown in FIG. 1 is executed by the JWS 422 shown in FIG. 5.

In FIG. 21B, B1 indicates a state where the program is installed in the MFP 101 shown in FIG. 1 from the SD card that is set in the PC 401 shown in FIG. 5. This installing of the program from the SD card cannot be made from the MA operation screen on other equipment but can be made from the MX operation screen on other equipment. Further, B2 indicates a state where the program is installed in the MFP 101 shown in FIG. 1 from the SD card that is set in the MFP 101 shown in FIG. 1. This installing of the program from the SD card cannot be made from the MA operation screen on other equipment but can be made from the MX operation screen on other equipment. Further, B3 indicates a state where the program is installed in the MFP 101 shown in FIG. 1 from the Web server that is connected to the PC 401 shown in FIG. 5 via a network. This installing of the program from the Web server may be made from the MA operation screen on other equipment or the MX operation screen on other equipment.

FIG. 21C shows a case where the operation to simultaneously install the program in 2 or more image forming apparatuses, including or excluding the MFP 101 shown in FIG. 1, is made from the operation screen that is displayed on the screen of the PC 401 shown in FIG. 5. The program cannot be installed in each of the image forming apparatuses from the operation screen (also referred to as "MA operation screen on other equipment") that is displayed when the Managing Applet 603 of the MFP 101 shown in FIG. 1 is executed by the Web browser 421 shown in FIG. 5, but can be installed in each of the image forming apparatuses from the operation screen (also referred to as "MX operation screen on other equipment") that is displayed when the Managing Xlet 604 of the MFP 101 shown in FIG. 1 is executed by the JWS 422 shown in FIG. 5.

In FIG. 21C, C1 indicates a state where the program is installed in the 2 or more image forming apparatuses, including or excluding the MFP 101 shown in FIG. 1, from the SD card that is set in the PC 401 shown in FIG. 5. This installing of the program from the SD card cannot be made from the MA operation screen on other equipment but can be made from the MX operation screen on other equipment. Further, C2 indicates a state where the program is installed in the 2 or more image forming apparatuses, including or excluding the MFP 101 shown in FIG. 1, from the Web server that is connected to the PC 401 shown in FIG. 5 via a network. This installing of the program from the Web server cannot be made from the MA operation screen on other equipment but can be made from the MX operation screen on other equipment.

In the states B1, B2, C1 and C2 shown in FIGS. 21B and 21C, the program can be installed from a storage medium such as the SD card or from an information processing apparatus such as the Web server into the image forming apparatuses including or excluding the MFP 101 shown in FIG. 1, from only the MX operation screen of other equipment, of the MA operation screen of other equipment and the MX operation screen of other equipment. But even in the case of the MX operation screen of other equipment, it is not unconditional, and it is necessary to provide the JSDK Emulator 435 that has the starting function to start the Xlet 434 and the absorbing function to absorb the differences in the execution environment of the Xlet 434.

Figure 22:
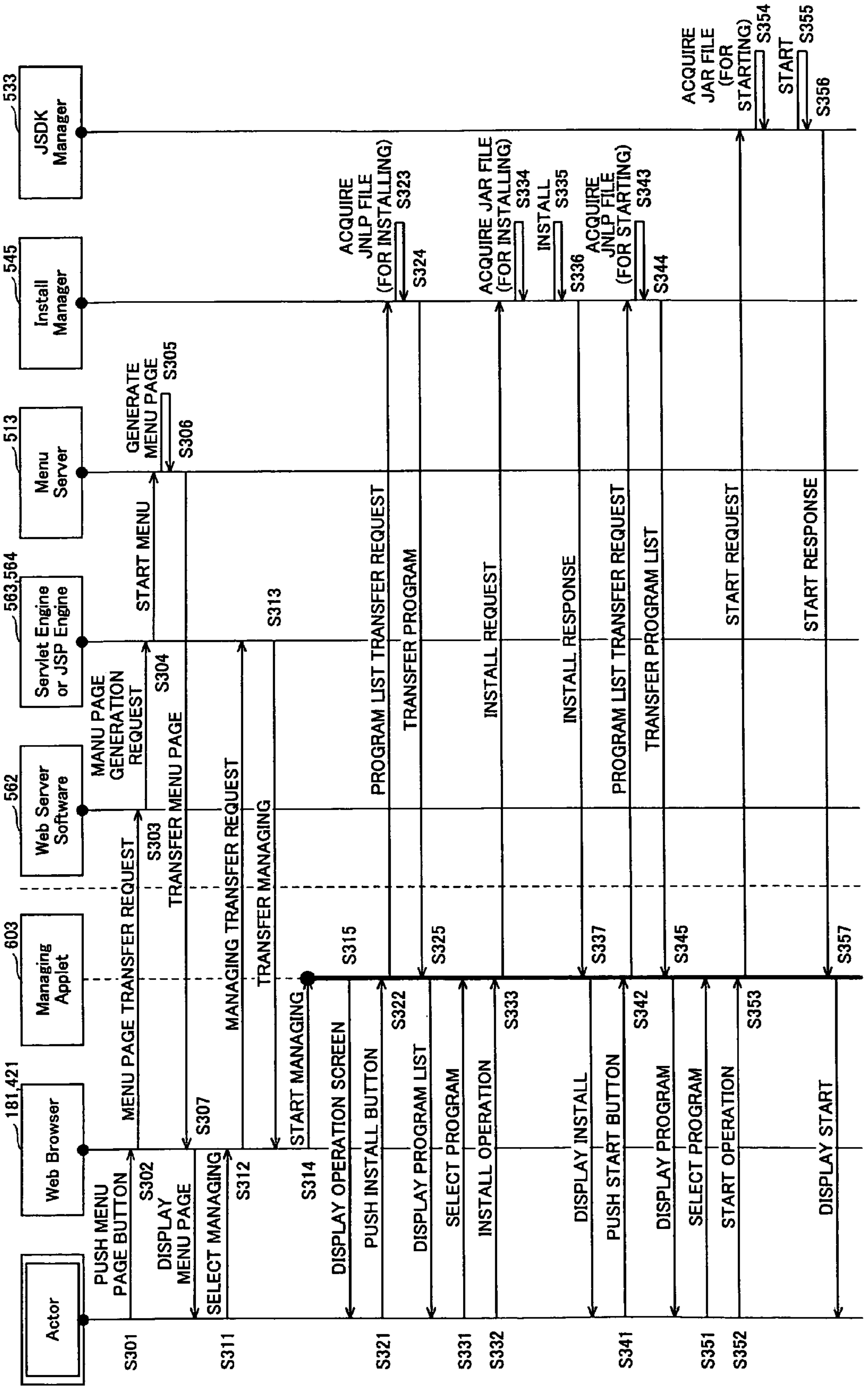
FIG. 22 is a sequence diagram related to a Managing Applet.

FIG. 22 is a sequence diagram related to the Managing Applet 603.

First, when a "menu page button" displayed on the screen of the operation panel 202 or the screen of the PC 401 by the Web browser 181 and the like is pushed (step S301), a "menu page" transfer request is sent from the Web browser 181 and the like to the Web server software 562 (step S302). Then, a "menu page" generation request is sent from the Web server software 562 to the Servlet Engine 563 and the like (step S303). The Servlet Engine 563 and the like starts the Menu Server 513 within the MFP 101 (step S304), and the Menu Server 513 generates a "menu page" (step S305). Further, the Menu Server 513 transfers the "menu page" to the Web browser 181 and the like (S306). The "menu page" is displayed on the screen of the operation panel 202 or the screen of the PC 401 by the Web browser 181 and the like (step S307). The "menu page" displays a list of the Applet 433 and the Xlet 434 that are stored in the MFP 101.

Next, when the "Managing Applet 603" is selected from the list that is displayed in the menu page on the screen of the operation panel 202 or the screen of the PC 401 (step S311), a transfer request for the Managing Applet 603 is sent from the Web browser 181 and the like to the Web server software 562 (step S312). Then, the Web server software 562 transfers the Managing Applet 603 to the Web browser 181 and the like, as the Web server (step S313), and the Web browser 181 and the like starts the Managing Applet 603 within the MFP 101 or the PC 401, as the Web client (step S314). The Managing Applet 603 displays the operation screen on the screen of the operation panel 202 or the screen of the PC 401 (step S315). A list of "programs" installable in the MFP 101 and a list of "programs" startable within the MFP 101 are displayed on the operation screen. On the operation screen, it is possible to carry out an operation to install the "program" in the MFP 101 and to start the "program" within the MFP 101.

Then, when an "install button" that is displayed on the operation screen on the screen of the operation panel 202 or the screen of the PC 401 is pushed (step S321), the Managing Applet 603 sends a transfer request for the list of the "programs" to the Install Manager 545 (step S322). The Install Manager 545 acquires the JNLP files of the "programs" installable in the MFP 101 from the SD card or the Web server (step S323). The Install Manager 545 transfers the list of the "programs" to the Managing Applet 603 (step S324). The list of the "programs" installable in the MFP 101 is displayed on the operation screen by the Managing Applet 603 on the screen of the operation panel 202 or the screen of the PC 401 (step S325).

When an arbitrary "program" is selected from the list that is displayed on the operation screen on the screen of the operation panel 202 or the screen of the PC 401 (step S331), and the operation is made to install the arbitrary "program" in the MFP 101 (step S332), an install request related to the arbitrary "program" is sent from the Managing Applet 603 to the Install Manager 545 (step S333). Then, the JAR file of the arbitrary "program" is acquired from the SD card or the Web server (step S334), and the arbitrary "program" is installed in the MFP 101 (step S335). The Install Manager 545 sends an install response related to the arbitrary "program" to the Managing Applet 603 (step S336). A display indicating that the arbitrary "program" has been installed in the MFP 101 is made on the operation screen on the screen of the operation panel 202 or the screen of the PC 401 (step S337).

Next, when a "start button" displayed on the operation screen is pushed on the screen of the operation panel 202 or the screen of the PC 401 (step S341), a transfer request for the list of the "programs" is sent from the Managing Applet 603 to the Install Manager 545 (step S342). The Install Manager 545 acquires JNLP files of the "programs" that are startable within the MFP 101, from the SD card or the HDD (step S343). The list of the "programs" is transferred from the Install Manager 545 to the Managing Applet 603 (step S344). The list of the "programs" that are startable within the MFP 101 is displayed on the operation screen by the Managing Applet 603, on the screen of the operation panel 202 or the screen of the PC 401 (step S345).

When an arbitrary "program" is selected from the list that is displayed on the operation screen on the screen of the operation panel 202 or the screen of the PC 401 (step S351), and the operation to start the arbitrary "program" within the MFP 101 is made (step S352), a start request related to the arbitrary "program" is sent from the Managing Applet 603 to the JSDK Manager 533 (step S353). The JAR file of the arbitrary "program" is acquired from the SD card or the HDD (step S354), and the arbitrary "program" is started within the MFP 101 (step S355). A start response related to the arbitrary "program" is sent from the JSDK Manager 533 to the Managing Applet 603 (step S356). A display indicating that the arbitrary "program" has been started within the MFP 101 is made on the operation screen, on the screen of the operation panel 202 or the screen of the PC 401 (step S357).

Figure 23:
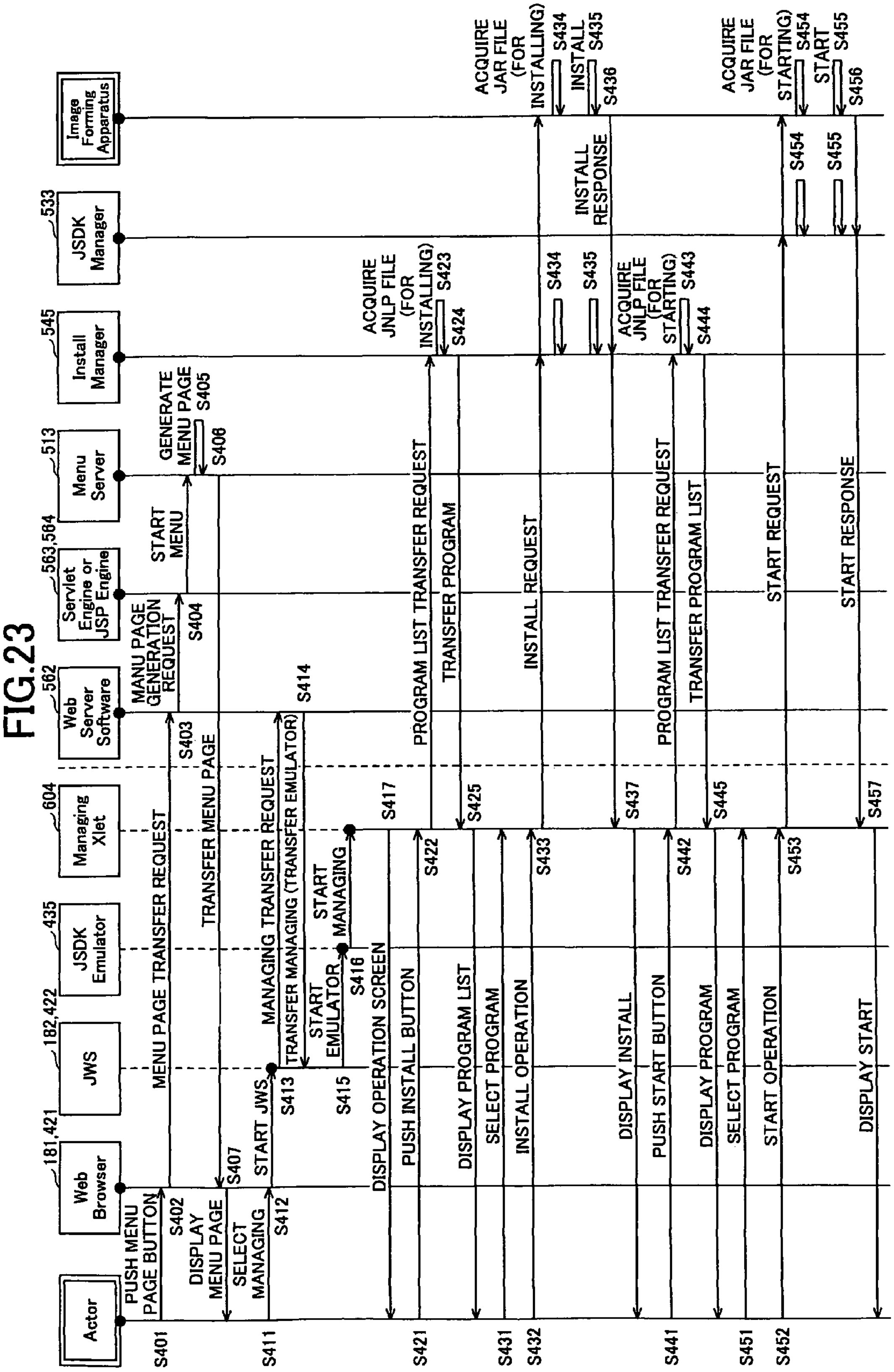
FIG. 23 is a sequence diagram related to a Managing Xlet.

FIG. 23 is a sequence diagram related to the Managing Xlet 604.

First, when a "menu page button" displayed on the screen of the operation panel 202 or the screen of the PC 401 by the Web browser 181 and the like is pushed (step S401), a "menu page" transfer request is sent from the Web browser 181 and the like to the Web server software 562 (step S402). Then, a "menu page" generation request is sent from the Web server software 562 to the Servlet Engine 563 and the like (step S403). The Servlet Engine 563 and the like starts the Menu Server 513 within the MFP 101 (step S404), and the Menu Server 513 generates a "menu page" (step S405). Further, the Menu Server 513 transfers the "menu page" to the Web browser 181 and the like (S406). The "menu page" is displayed on the screen of the operation panel 202 or the screen of the PC 401 by the Web browser 181 and the like (step S407). The "menu page" displays a list of the Applet 433 and the Xlet 434 that are stored in the MFP 101.

Next, when the "Managing Xlet 604" is selected from the list that is displayed in the menu page on the screen of the operation panel 202 or the screen of the PC 401 (step S411), the Web browser 118 and the like starts the JWS 182 and the like within the MFP 101 or within the PC 401 (step S412). A transfer request for the Managing Xlet 604 is sent from the JWS 182 and the like to the Web server software 562 (step S413). Then, the Web server software 562 transfers the Managing Xlet 604 and the JSDK Emulator 435 (stored in the MFP 101 shown in FIG. 1 or stored in the server shown in FIG. 6) to the JWS 182 and the like, as the Web server (step S414), and the JWS 182 and the like, as the Web client, starts the JSDK Emulator 435 within the MFP 101 or within the PC 401 (step S415), and the JSDK Emulator 435 starts the Managing Xlet 604 within the MFP 101 or within the PC 401 (step S416). The Managing Xlet 604 displays the operation screen on the screen of the operation panel 202 or the screen of the PC 401 (step S417). A list of "programs" installable in the various kinds of image forming apparatuses such as the MFP 101 and a list of "programs" startable within the various kinds of image forming apparatuses such as the MFP 101 are displayed on the operation screen. On the operation screen, it is possible to carry out an operation to install the "program" in the various kinds of image forming apparatuses such as the MFP 101 and to start the "program" within the various kinds of image forming apparatuses such as the MFP 101.

Then, when an "install button" that is displayed on the operation screen on the screen of the operation panel 202 or the screen of the PC 401 is pushed (step S421), the Managing Xlet 604 sends a transfer request for the list of the "programs" to the Install Manager 545 (step S422). The Install Manager 545 acquires the JNLP files of the "programs" installable in the various kinds of image forming apparatuses such as the MFP 101 from the SD card or the Web server (step S423). The Install Manager 545 transfers the list of the "programs" to the Managing Xlet 604 (step S424). The list of the "programs" installable in the various kinds of image forming apparatuses such as the MFP 101 is displayed on the operation screen by the Managing Xlet 604 on the screen of the operation panel 202 or the screen of the PC 401 (step S425).

When an arbitrary "program" is selected from the list that is displayed on the operation screen on the screen of the operation panel 202 or the screen of the PC 401 (step S431), and the operation is made to install the arbitrary "program" in various kinds of image forming apparatuses such as the MFP 101 (step S432), an install request related to the arbitrary "program" is sent from the Managing Xlet 604 to the Install Manager 545 (step S433). Then, the JAR file of the arbitrary "program" is acquired from the SD card or the Web server (step S434), and the arbitrary "program" is installed in the various kinds of image forming apparatuses such as the MFP 101 (step S435). The Install Manager 545 sends an install response related to the arbitrary "program" to the Managing Xlet 604 (step S436). A display indicating that the arbitrary "program" has been installed in the various kinds of image forming apparatuses such as the MFP 101 is made on the operation screen on the screen of the operation panel 202 or the screen of the PC 401 (step S437).

Next, when a "start button" displayed on the operation screen is pushed on the screen of the operation panel 202 or the screen of the PC 401 (step S441), a transfer request for the list of the "programs" is sent from the Managing Xlet 604 to the Install Manager 545 (step S442). The Install Manager 545 acquires JNLP files of the "programs" that are startable within the various kinds of image forming apparatuses such as the MFP 101, from the SD card or the HDD (step S443). The list of the "programs" is transferred from the Install Manager 545 to the Managing Xlet 604 (step S444). The list of the "programs" that are startable within the various kinds of image forming apparatuses such as the MFP 101 is displayed on the operation screen by the Managing Xlet 604, on the screen of the operation panel 202 or the screen of the PC 401 (step S445).

When an arbitrary "program" is selected from the list that is displayed on the operation screen on the screen of the operation panel 202 or the screen of the PC 401 (step S451), and the operation to start the arbitrary "program" within the various kinds of image forming apparatuses such as the MFP 101 is made (step S452), a start request related to the arbitrary "program" is sent from the Managing Xlet 604 to the various kinds of image forming apparatuses such as the MFP 101 (JSDK Manager 533) (step S453). The JAR file of the arbitrary "program" is acquired from the SD card or the HDD (step S454), and the arbitrary "program" is started within the various kinds of image forming apparatuses such as the MFP 101 (step S455). A start response related to the arbitrary "program" is sent from the various kinds of image forming apparatuses such as the MFP 101 (JSDK Manager 533) to the Managing Xlet 604 (step S456). A display indicating that the arbitrary "program" has been started within the various kinds of image forming apparatuses such as the MFP 101 is made on the operation screen, on the screen of the operation panel 202 or the screen of the PC 401 (step S457).

Therefore, according to the first and second concrete examples, the applications of the image forming apparatus 101 such as the Applet and the Xlet can be executed in the PC 401. The Xlet in particular is started by the JSDK Emulator 435, independently of the Web browser. Since the JSDK Emulator 435 has the absorbing function to function the differences in the execution environment, the Xlet that is created with respect to the image forming apparatus can be executed as it is (without making any modifications) in the PC 401. Consequently, it is possible to reduce the number of developing processes when developing the Xlet.

(3) Special MFP

The normal MFP 101 is provided with a single mother board and a single LAN board, and has one MAC address and one IP address. But a special MFP 101 is provided with 2 mother boards and 2 LAN boards, and has 2 MAC addresses and 2 IP addresses. One MAC address and one IP address are used for the MFP 101, while the other MAC address and the other IP address are used for the operation panel 202, and the MFP 101 and the operation panel 202 communicate by TCP/IP. Hence, this implementation make the single MFP 101 function as if 2 PCs are provided therein. Since the control of the operation panel 202 is independent from the control of the MFP 101, it becomes possible to execute in the MFP 101 an application having a large capacity and usually executed in the PC.

The first and second concrete examples may be applied to the special MFP 101 described above. When the operation panel 202 of the special MFP 101 functions as the Web client, the classification "own equipment" belongs to the case where the operation panel 202 becomes the Web client, but from the point of view of the information processing it is in some ways similar to the case where the "other equipment" is the Web client.

Modification

The MFP 101 corresponds to the embodiment of the "image forming apparatus" according to the present invention. The information processing executed by the MFP 101 shown in FIG. 1 and the like corresponds to the embodiment of the "application executing method" according to the present invention. A computer program (application executing program) causes a computer to execute the application executing method. A recording medium which stores the application executing program corresponds to the embodiment of the "computer-readable storage medium" according to the present invention. The recording medium may be formed by any type of media capable of storing the application executing program in a computer-readable manner, such as CD-ROM, DVD-ROM and SD card (or SD memory card).

Emulator

Figure 24:
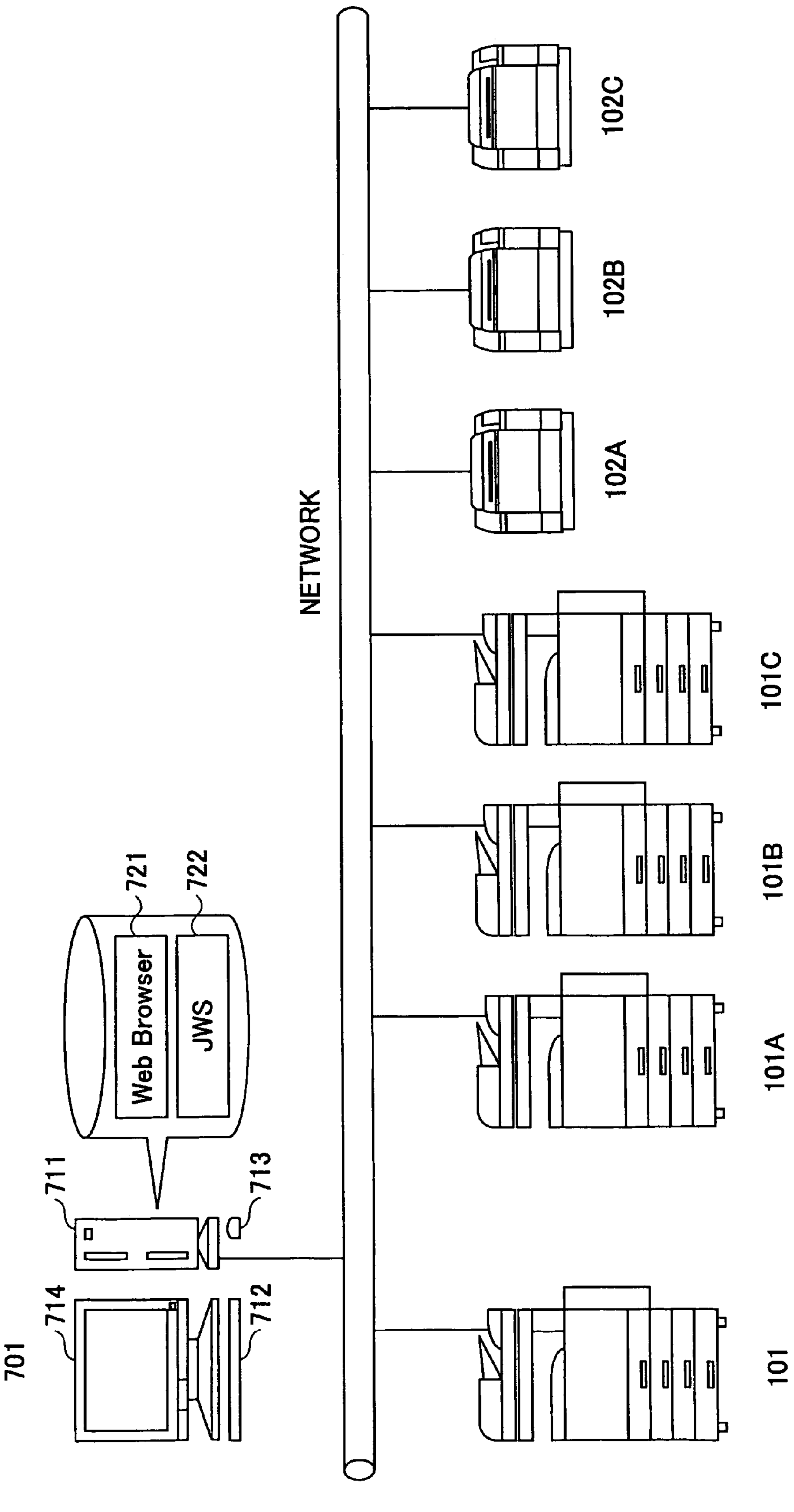
FIG. 24 is a diagram showing a PC corresponding to an embodiment of the present invention.

FIG. 24 is a diagram showing a PC 701 corresponding to an embodiment of the present invention. The PC 701 shown in FIG. 24 includes a main PC body 711, a keyboard 712, a mouse 713 and a display 714. The main PC body 711 shown in FIG. 24 includes a CPU, a ROM, a RAM, a HDD, a modem, a NIC and the like. A Web browser 721 and a JWS 722 are installed in the HDD within the main PC body 711 shown in FIG. 24.

Similarly to the PC 401 shown in FIG. 5, the PC 701 shown in FIG. 24 is connected to the MFP 101 via a network, and functions as a Web client that regards the MFP 101 shown in FIG. 1 as the Web server. The PC 701 shown in FIG. 24 carries out the functions that are carried out by the PC 401 shown in FIG. 5 in the first and second concrete examples. The roles played by the Web browser 421 and the JWS 422 shown in FIG. 5 are played by the Web browser 721 and the JWS 722 shown in FIG. 24.

The PC 701 shown in FIG. 24 functions as the emulator of the MFP 101 shown in FIG. 1. The keyboard 712 and the mouse 713 shown in FIG. 24 function as the operation panel 202 shown in FIG. 2, that is, a hardware (operation part) operated by an operator to make an input to the PC 701. The display 714 shown in FIG. 24 functions as the operation panel 202, that is, a hardware (display part) for the operator to obtain an output from the PC 701.

Figure 25:
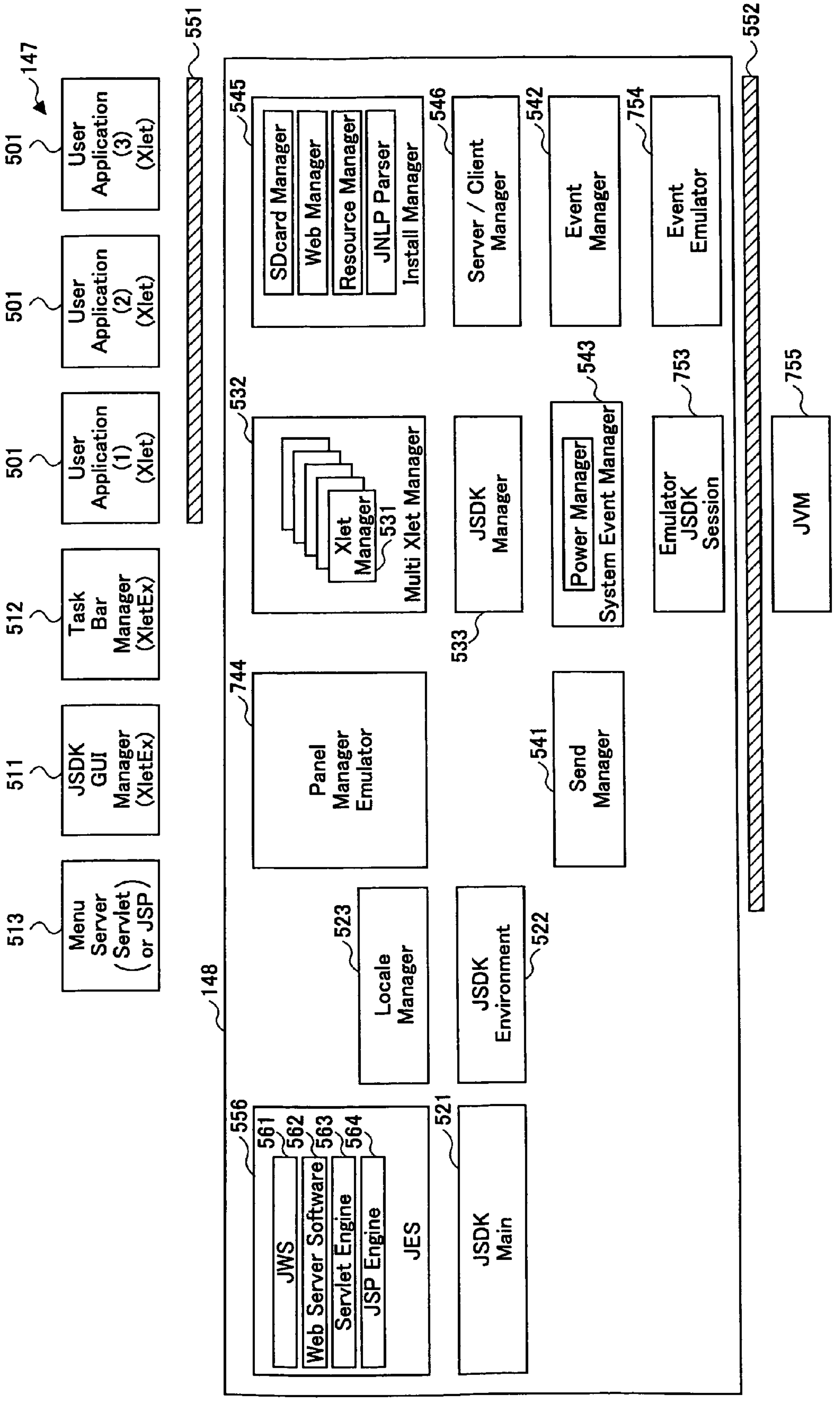
FIG. 25 is a diagram showing classes of a JSDK application and a JSDK platform within the PC.

FIG. 25 is a diagram showing classes the JSDK applications 147 and the JSDK platforms 148 within the PC 701 shown in FIG. 24. The JSDK applications 147 and the JSDK platforms 148 that are similar to those of the MFP 101 shown in FIG. 1 are provided within the PC 701 shown in FIG. 25. The classes of the JSDK applications 147 and the JSDK platforms 148 within the MFP 101 shown in FIG. 1 was described above in conjunction with FIG. 8. A description will now be given of the differences between the classes shown in FIGS. 8 and 25.

First, the Panel Manager 544 shown in FIG. 8 is replaced by a Panel Manager Emulator 744 shown in FIG. 25. Second, the JSDK Session 553 shown in FIG. 8 is replaced by an Emulator JSDK Session 753 shown in FIG. 25. Third, the Native JSDK Session 554 shown in FIG. 8 is replaced by an Event Emulator 754 shown in FIG. 25. Fourth, the CVM 555 shown in FIG. 8 is replaced by a JVM 755 shown in FIG. 25.

The Panel Manager Emulator 744 is a class that emulates the Panel Manager 544 and translates the operation of the operation panel 202 into the operation of the keyboard 712 and/or the mouse 713. The Emulator JSDK Session 753 is a class that executes a communication path (or route) establishing process. The Event Emulator 754 is a class that emulates the operation of the MFP 101. The JVM 755 is a Java Virtual Machine for executing the JSDK applications 147 and the JSDK platforms 148.

A start procedure of the JSDK system within the PC 701 is similar to that shown in FIG. 9, and the GUI of the JSDK system within the PC 701 is similar to that shown in FIG. 10. The GUI is an operation screen which regards the user application 501 within the MFP 101 or within the PC 701 as the operating target, and is displayed by the JSDK GUI Manager 511 within the PC 701. The operation part is formed by the keyboard 712 and the mouse 713, and the display part is formed by the display 714.

Figure 26:
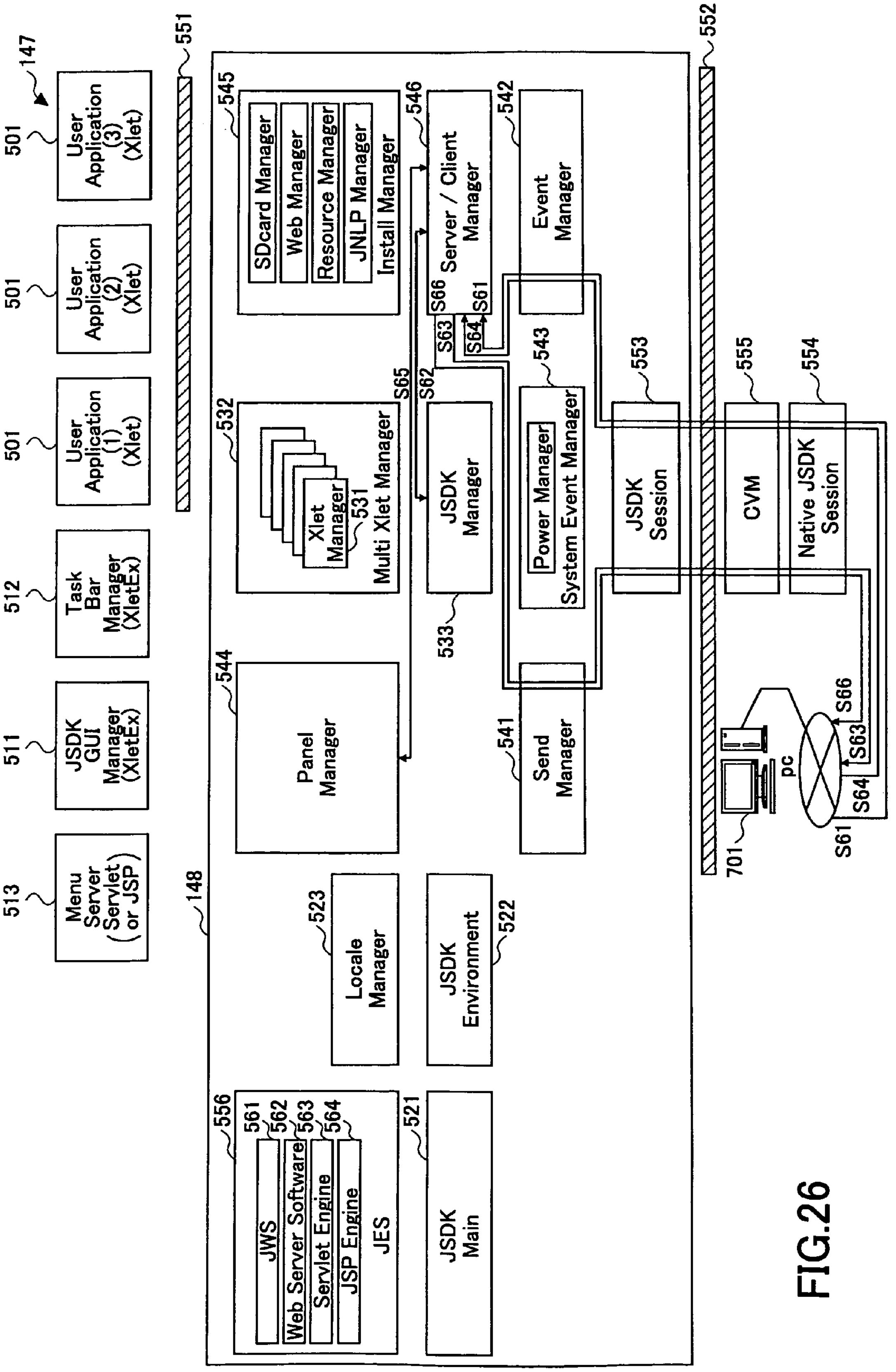
FIG. 26 is a diagram for explaining an executing procedure of a remote operation preparing process executed within the MFP.

FIG. 26 is a diagram for explaining an executing procedure of a remote operation preparing process executed within the MFP 101 shown in FIG. 1.

First, a session is established between the Server/Client Manager 546 within the MFP 101 and the Server/Client Manager 546 within the PC 701 (step S61).

Then, the Server/Client Manager 546 within the MFP 101 inquires the JSDK Manager 533 within the MFP 101 whether or not a transition may be made to the remote operation, and judges whether or not the transition to the remote operation can be made (step S62).

If the transition to the remote operation is possible, the Server/Client Manager 546 within the MFP 101 sends a request related to a message necessary for the remote operation to the PC 701 via the Send Manager 541 within the MFP 101 (step S63), and receives a response related to the message necessary for the remote operation from the PC 701 via the Event Manager 542 within the MFP 101 (step S64).

Thereafter, the Server/Client Manager 546 within the MFP 101 sends a request to the Panel Manager 544 requesting information for the remote operation to the PC 701 (step S65).

Finally, a notification indicating that the remote operation preparing process is exchanged between the Server/Client Manager 546 within the MFP 101 and the Server/Client Manager 546 within the PC 701 (step S66). Accordingly, it becomes possible to make the remote operation from the PC 701 with respect to the MFP 101.

When the PC 701 shown in FIG. 24 that functions as the emulator of the MFP 101 shown in FIG. 1 is used as the Web client which regards the MFP 101 shown in FIG. 1 as the Web server, the following advantageous features can be obtained. First, it becomes possible to realize a debugging environment for the Applet 433 and the Xlet 434. In other words, the debugging operation with respect to the Applet 601 and the Xlet 602 of the first concrete example or, the Applet 603 and the Xlet 604 of the second concrete example, can be realized in an environment similar to that of the MFP 101 shown in FIG. 1 while suitably utilizing remote operation and the like of to the MFP 101 shown in FIG. 1. Second, it becomes possible to suitably utilize the remote operation of the MFP 101 shown in FIG. 1 when using the Applet 433 and the Xlet 434. In other words, if the operation of the MFP 101 shown in FIG. 1 becomes necessary when using the Applet 601 and the Xlet 602 of the first concrete example or, the Applet 603 and the Xlet 604 of the second concrete example, it is possible to suitably utilize the remote operation of the MFP 101 shown in FIG. 1.

Modification

The PC 701 shown in FIG. 24 corresponds to the embodiment of the "terminal equipment" according to the present invention. The information processing executed by the PC 701 shown in FIG. 24 corresponds to the embodiment of the "information processing method" according to the present invention. A computer program (information processing program) causes a computer to execute the information processing method. A recording medium which stores the information processing program corresponds to another embodiment of the "computer-readable storage medium" according to the present invention. The recording medium may be formed by any type of media capable of storing the application executing program in a computer-readable manner, such as CD-ROM, DVD-ROM and SD card (or SD memory card).

This application claims the benefit of Japanese Patent Applications No. 2004-260188 filed Sep. 7, 2004, No. 2004-260190 filed Sep. 7, 2004 and No. 2005-237851 filed Aug. 18, 2005, in the Japanese Patent Office, the disclosures of which are hereby incorporated by reference.

Further, the present invention is not limited to these embodiments, but various variations and modifications may be made without departing from the scope of the present invention.

The invention claimed is:

1. An application executing method for making an information processing apparatus coupled to an image forming apparatus via a network to execute an application that functions in the image forming apparatus, comprising:

a downloading step downloading an emulator from the image forming apparatus by the information processing apparatus;

a starting step starting the downloaded emulator by the information processing apparatus; and an execution environment absorbing step absorbing differences in an execution environment of the application between the image forming apparatus and the information processing apparatus using the downloaded emulator, by the information processing apparatus, so as to realize functions of the application in the information processing apparatus, wherein the execution environment absorbing step displays on a display of the information processing apparatus a screen corresponding to an operation screen of the application, the operation screen being displayed by the application on an operation panel of the image forming apparatus.

2. The application executing method as claimed in claim 1, wherein the execution environment absorbing step communicates between the information processing apparatus and the image forming apparatus in response to a request from the application.

3. The application executing method as claimed in claim 1, wherein the image forming apparatus at a downloading source of the application is caused to execute a process based on the application that is realized in the information processing apparatus by the execution environment absorbing step.

4. The application executing method as claimed in claim 1, wherein an image forming apparatus which is different from the image forming apparatus at a downloading source of the application is caused to execute a process based on the application that is realized in the information processing apparatus by the execution environment absorbing step.

5. An information processing apparatus for executing an application that functions in an image forming apparatus which is coupled to the information processing apparatus via a network, comprising:

a display;

a downloading part configured to download an emulator from the image forming apparatus;

a starting part configured to start the downloaded emulator; and an execution environment absorbing part configured to absorb differences in an execution environment of the application between the image forming apparatus and the information processing apparatus using the downloaded emulator, so as to realize functions of the application in the information processing apparatus, wherein the execution environment absorbing part displays on the display a screen corresponding to an operation screen of the application, the operation screen being displayed by the application on an operation panel of the image forming apparatus.

6. The information processing apparatus as claimed in claim 5, wherein the execution environment absorbing part communicates with the image forming apparatus in response to a request from the application.

7. The information processing apparatus as claimed in claim 5, wherein the image forming apparatus at a downloading source of the application is caused to execute a process based on the application that is realized in the information processing apparatus by the execution environment absorbing part.

8. The information processing apparatus as claimed in claim 5, wherein an image forming apparatus which is different from the image forming apparatus at a downloading source of the application is caused to execute a process based on the application that is realized in the information processing apparatus by the execution environment absorbing part.

9. An image forming apparatus adapted to execute an application, comprising:

an operation panel;

an application providing part configured to send the application to an information processing apparatus that is coupled to the image forming apparatus via a network, in response to a request from the information processing apparatus;

a communicating part configured to communicate with the information processing apparatus, so as to cause the information processing apparatus to absorb differences in an execution environment of the application between the image forming apparatus and the information processing apparatus; and a part configured to send to the information processing apparatus an emulator that absorbs the differences in the execution environment, in response to a request from the information processing apparatus, wherein the application displays on a display of the information processing apparatus a screen corresponding to an operation screen of the application, the operation screen being displayed by the application on the operation panel.

10. A computer-readable storage medium which stores an application executing program for causing an information processing apparatus that is coupled to an image forming apparatus via a network to execute an application that functions in the image forming apparatus, said application executing comprising:

a starting procedure causing the information processing apparatus to start an emulator that is downloaded from the image forming apparatus; and an execution environment absorbing procedure causing the information processing apparatus to absorb differences in an execution environment of the application between the image forming apparatus and the information processing apparatus using the downloaded emulator, so as to realize functions of the application in the information processing apparatus, wherein the execution environment absorbing procedure causes the information processing apparatus to display on a display thereof a screen corresponding to an operation screen of the application, the operation screen being displayed by the application on an operation panel of the image forming apparatus.

11. The computer-readable storage medium as claimed in claim 10, wherein the execution environment absorbing procedure causes the information processing apparatus to communicate with the image forming apparatus in response to a request from the application.

12. The computer-readable storage medium as claimed in claim 10, wherein the image forming apparatus at a downloading source of the application is caused to execute a process based on the application that is realized in the information processing apparatus by the execution environment absorbing procedure.

13. The computer-readable storage medium as claimed in claim 10, wherein an image forming apparatus which is different from the image forming apparatus at a downloading source of the application is caused to execute a process based on the application that is realized in the information processing apparatus by the execution environment absorbing procedure.

* * * * *